US010796259B2

(12) United States Patent
Sullivan et al.

(10) Patent No.: US 10,796,259 B2
(45) Date of Patent: Oct. 6, 2020

(54) RISK AND DEPENDENCY TRACKING AND CONTROL SYSTEM

(71) Applicant: Microsoft Technology Licensing, LLC, Redmond, WA (US)

(72) Inventors: Joseph Sullivan, Lynnwood, WA (US); Jill Campbell, Seattle, WA (US); Ngoc Vu Bui, Redmond, WA (US); Nir Michaely, Redmond, WA (US); Chenying Yang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/124,613

(22) Filed: Sep. 7, 2018

(65) Prior Publication Data

US 2019/0347094 A1 Nov. 14, 2019

Related U.S. Application Data

(60) Provisional application No. 62/763,128, filed on May 8, 2018.

(51) Int. Cl.
*G06F 9/44* (2018.01)
*G06Q 10/06* (2012.01)
(Continued)

(52) U.S. Cl.
CPC ....... *G06Q 10/0635* (2013.01); *G06F 3/0482* (2013.01); *G06F 3/0486* (2013.01);
(Continued)

(58) Field of Classification Search
CPC .................................................. G06Q 10/0635
(Continued)

(56) References Cited

U.S. PATENT DOCUMENTS

2003/0033191 A1 2/2003 Davies et al.
2003/0167265 A1 9/2003 Corynen
(Continued)

OTHER PUBLICATIONS

CA Technologies, "CA PPM 14.2 Documentation", Aug. 2017, pp. 1-10 (Year: 2017).*
(Continued)

*Primary Examiner* — Wei Y Zhen
*Assistant Examiner* — Lanny N Ung
(74) *Attorney, Agent, or Firm* — Christopher J. Volkmann; Kelly, Holt & Christenson, PLLC

(57) ABSTRACT

A computing system includes a connection detection system that identifies a set of connected deliverables among a plurality of different deliverables in a data store and timeline generator logic that generates a representation of a timeline having nodes connected by edges, each node representing a deliverable and each edge connecting a pair of nodes corresponding to a connection between the deliverables represented by the pair of nodes connected by the edge. The computing system also includes a user interaction system that controls interaction with the plurality of different deliverables, the user interaction system comprising link setting logic that generates a link setting user interface mechanism that is actuatable to modify one or more connections and surfacing logic that controls a display to display the representation of the timeline and the link setting user interface mechanism.

18 Claims, 21 Drawing Sheets

(51) Int. Cl.
*G06F 3/0482* (2013.01)
*G06F 3/0484* (2013.01)
*G06F 3/0486* (2013.01)
*G06F 8/77* (2018.01)
*G06Q 10/10* (2012.01)

(52) U.S. Cl.
CPC ............ *G06F 3/04847* (2013.01); *G06F 8/77* (2013.01); *G06Q 10/103* (2013.01)

(58) Field of Classification Search
USPC .......................................................... 717/105
See application file for complete search history.

(56) References Cited

U.S. PATENT DOCUMENTS

| | | |
|---|---|---|
| 2005/0027386 A1 | 2/2005 | Weigand et al. |
| 2007/0106599 A1 | 5/2007 | Hochberg et al. |
| 2007/0288283 A1 | 12/2007 | Fitzpatrick |
| 2008/0127041 A1 | 5/2008 | Gura |
| 2008/0195452 A1* | 8/2008 | Ponce de Leon ...... G06Q 10/06 705/7.12 |
| 2011/0071869 A1* | 3/2011 | O'Brien ................ G06Q 10/06 705/7.12 |
| 2015/0161542 A1* | 6/2015 | Ashtiani .......... G06Q 10/06313 705/7.23 |
| 2015/0254597 A1 | 9/2015 | Jahagirdar |
| 2015/0278219 A1 | 10/2015 | Phipps |
| 2016/0371618 A1 | 12/2016 | Leidner et al. |
| 2017/0031536 A1 | 2/2017 | Shah et al. |
| 2019/0347589 A1 | 11/2019 | Sullivan et al. |

OTHER PUBLICATIONS

"International Search Report and Written Opinion Issued in PCT Application No. PCT/US2019/030089", dated Jul. 17, 2019, 18 Pages.

"International Search Report and Written Opinion Issued in PCT Application No. PCT/US2019/030092", dated Jul. 17, 2019, 18 Pages.

"Non Final Office Action Issued in U.S. Appl. No. 16/124,686", dated Jun. 23, 2020, 25 Pages.

Fu, et al., "Impact propagation and risk assessment of requirement changes for software development projects based on design structure matrix", In International Journal of Project Management, vol. 30, Issue 3, Apr. 2012, pp. 363-373.

Kumar, et al., "A probabilistic software risk assessment and estimation model for software projects", In Journal of Procedia Computer Science, vol. 54, 2015, pp. 353-361.

* cited by examiner

US 10,796,259 B2

RISK AND DEPENDENCY TRACKING AND CONTROL SYSTEM

CROSS-REFERENCE TO RELATED APPLICATION

The present application is based on and claims the benefit of U.S. provisional patent application Ser. No. 62/763,128, filed May 8, 2018, the content of which is hereby incorporated by reference in its entirety.

BACKGROUND

Computing systems are currently in wide use. Some computing systems host services that can be used by users of various different tenants. Each tenant can correspond to a different organization, that has a different set of users.

Many organizations are quite large and have many users. The users may work in different departments, generate different deliverables, and use the hosted services in different ways. Therefore, it can be difficult to communicate collaborative action information between various users.

The discussion above is merely provided for general background information and is not intended to be used as an aid in determining the scope of the claimed subject matter.

SUMMARY

A computing system includes a connection detection system that identifies a set of connected deliverables among a plurality of different deliverables in a data store and timeline generator logic that generates a representation of a timeline having nodes connected by edges, each node representing a deliverable and each edge connecting a pair of nodes corresponding to a connection between the deliverables represented by the pair of nodes connected by the edge. The computing system also includes a user interaction system that controls interaction with the plurality of different deliverables, the user interaction system comprises link setting logic that generates a link setting user interface mechanism that is actuatable to modify one or more connections and surfacing logic that controls a display to display the representation of the timeline and the link setting user interface mechanism.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Many developer organizations are quite large and have many users. The users may work in several different teams or groups to develop different deliverables that are part of a larger project. The term deliverables broadly covers different objectives and projects that make up a larger project. For example, a deliverable can include functionality (such as code, tools, logic, etc.) that supports a story (e.g., "make the interface more user friendly"), customer promises (e.g., promised customer to increase performance during high load), scenarios (e.g., "Engineers need testing environment more analogous to lab setting"), and tasks (e.g., "check backwards compatibility with older OS"). It can be made up of deliverable packages or pieces of code (e.g., hardware driver, software class, API, etc.), bug corrections (e.g., fix shaders module from crashing during execution), etc.

A large project can often times have a scheduled release date at which point, all deliverables should be complete. However, as many deliverables are dependent on one another for completion, it is helpful for each individual deliverable to remain on schedule or, if a deliverable begins to deviate from its timeline, to see the effects of the deviation. For example, if there is a delay in completing a deliverable that has relatively few items dependent on it, this may have a small impact on the overall project. However, if there is a delay in completing a deliverable that has many items dependent on it, this may have a large impact on the project and increase the risk that the project will not meet its scheduled release date. A first deliverable that is dependent upon a second deliverable may be referred to below as 'consuming from' the second deliverable. Conversely the second deliverable may be referred to below as 'producing for' the first deliverable.

Tracking and effectively displaying an interactive timeline tree of dependencies, with various control actuators, can allow a project manager or other user to see the bottle necks of a project and to control items in response. For example, a first team may be behind schedule, however, it may not be their fault. Instead it may be because a second team is behind in producing an item or deliverable that the first team is dependent on.

Further, providing a simpler interface to create links between deliverables may be useful. Currently, there is no simple means of creating links between deliverables in a team project environment.

Figure 1A:
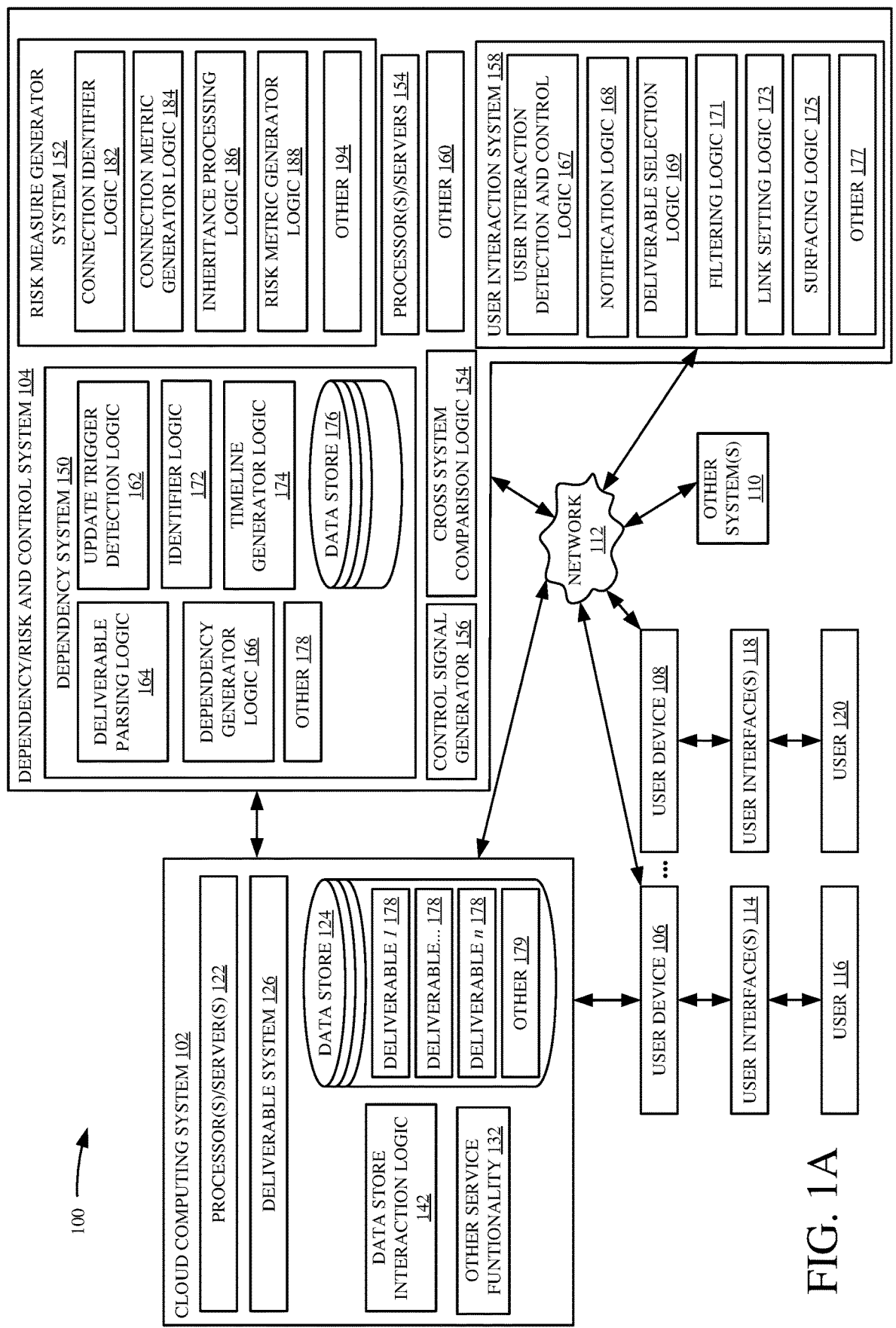
FIG. 1A is a block diagram of one example of a computing system architecture.

FIG. 1A is a block diagram of one example of a computing system architecture 100. Architecture 100 illustratively includes a computing system 102, dependency/risk and control system 104, user devices 106-108 and other systems 110, all connected to one another either directly, or over network 112. Network 112 can be any of a wide variety of different types of networks, such as a wide area network, a local area network, a near field communication network, a cellular communication network, or any of a wide variety of other networks or combinations of networks.

In the example shown in FIG. 1A, user device 106 is shown generating user interfaces 114 for interaction by user 116. User 116 illustratively interacts with user interfaces 114 to control and manipulate user device 106 and some portions of computing system 102. Similarly, user device 108 is shown generating user interfaces 118 for interaction by user 120. User 120 illustratively interacts with user interfaces 118 in order to control and manipulate user device 108 and portions of computing system 102. Users 116 and 120 may be part of a single organization (or tenant). Therefore, they use their user devices 106-108, respectively, in order to use the services hosted by computing system 102.

In the example shown in FIG. 1A, computing system 102 illustratively includes one or more processors or servers 122, one or more data stores 124, a deliverable system 126, communication system 128 and it can include a wide variety of other service functionality 132. Processors or servers 122 can execute the functionality of deliverable system 126, data store interaction logic 142 and other service functionality 132. Data store 124 includes data relating to a plurality of deliverables 178. However, data store 124 can include other data as well, as indicated by block 179.

Figure 1B:
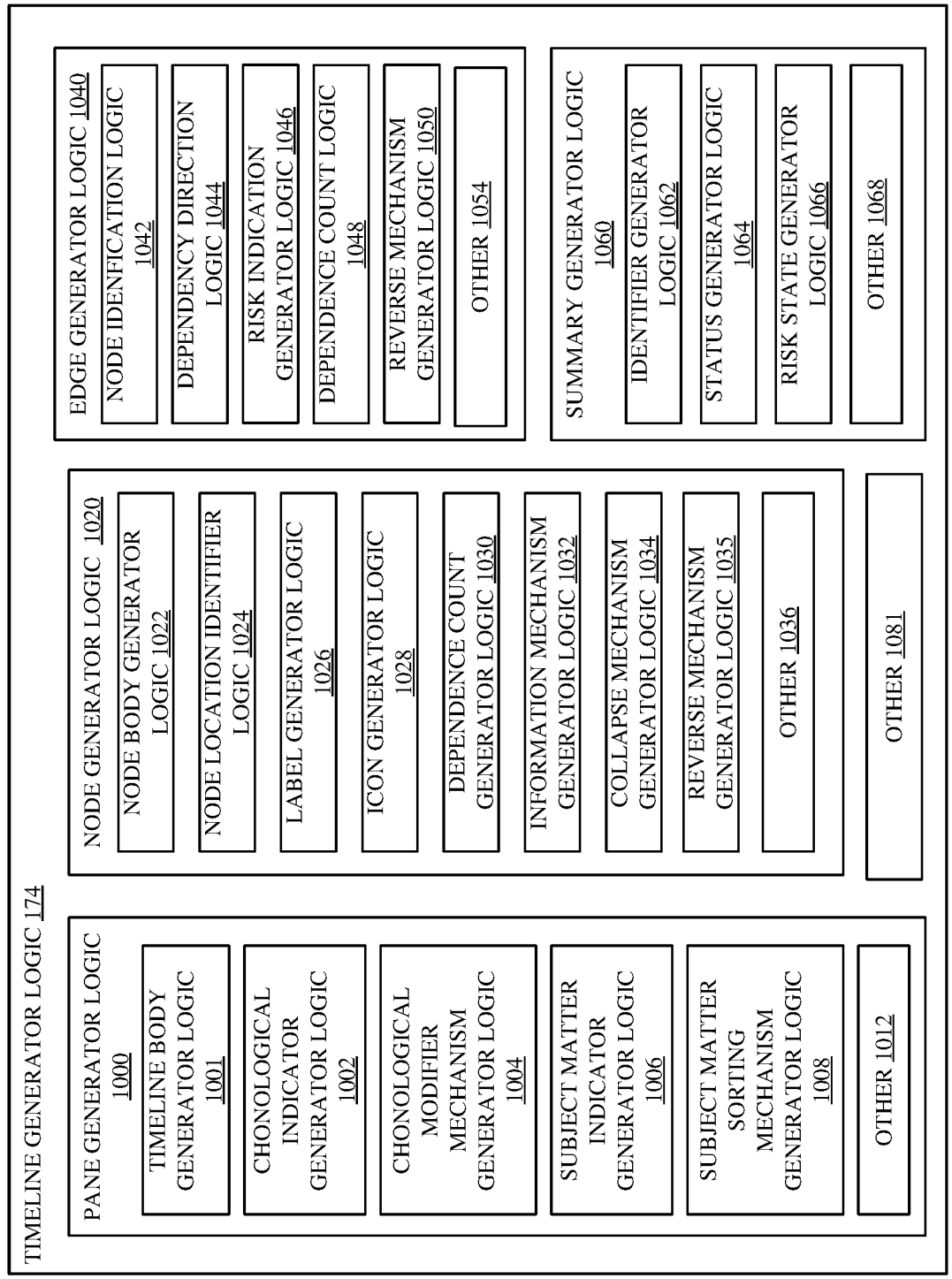
FIG. 1B is a block diagram of one example of timeline generator logic.
Figure 1C:
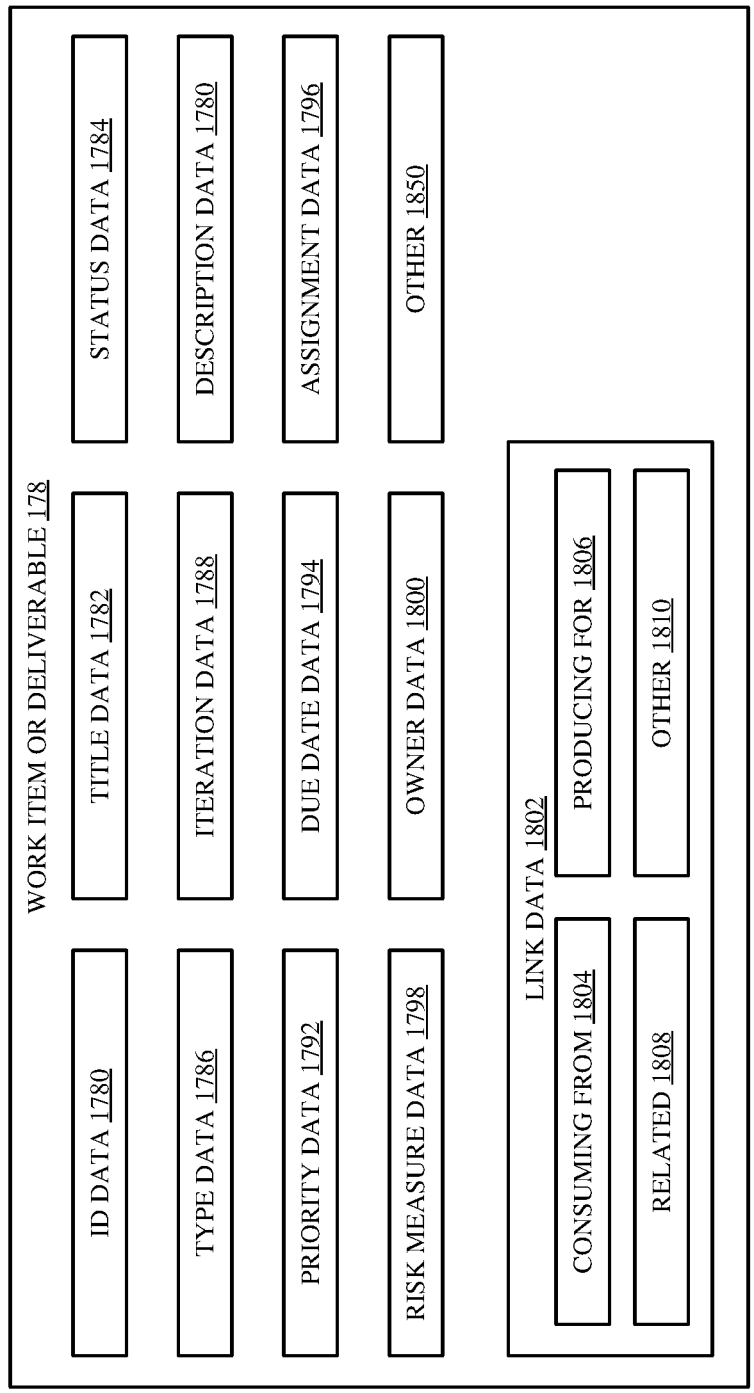
FIG. 1C is a block diagram showing one example of a deliverable.

Before describing the remaining components of FIG. 1A it may be beneficial to describe a deliverable in greater detail with respect to FIG. 1C. FIG. 1C is a block diagram showing one detailed example of a deliverable 178. Deliverable 178 as shown includes a variety of different data components. However, deliverable 178 can include other items as well as indicated by block 1850.

Deliverable 178 illustratively includes ID data 1780. ID data 1780 is indicative of an identifier for the given deliverable 178. For example, and ID in ID data 1780 can be a number or other unique identifier used to track the deliverable in a database.

Deliverable 178 illustratively includes title data 1782. Title data 1782 can be indicative of a title of the deliverable 178. Title data 1782 ideally includes a title\ in a human readable language and allows a developer to identify the deliverable 178. This is opposed to ID from ID data 1780 which can be primarily for computer identification (e.g., a unique identifier in a database). An example title may be "hardware driver for sound card."

Deliverable 178 illustratively includes status data 1784. Status data 1784 can include information on the current state of deliverable 178. For example, state data can include the developmental state of deliverable 178. For instance, possible states can include proposed, committed, started, completed or cut.

Deliverable 178 illustratively includes type data 1786. Type data 1786 can be indicative of the type of work item. For example, possible work item types include stories, customer promises, scenarios, deliverables, task groups, tasks or measures.

Deliverable 178 illustratively includes iteration data 1788. Iteration data 1788 can be indicative of the current iteration of deliverable 178. For example, an iteration can be the current version and/or build of the deliverable (e.g., v1.1.1).

Deliverable 178 illustratively includes description data 1790. Description data 1790 is indicative of the description of deliverable 178. Description data 1790 can briefly describe the objective of the deliverable. An example description may be "Fix the bug issues when a user is in compatibility mode."

Deliverable 178 illustratively includes priority data 1792. Priority data 1792 is indicative of the priority of deliverable 178. That is, a priority or importance of deliverable to the overall project of which deliverable is part of. Some examples of priority levels include very high, high, medium, low, very low, etc.

Deliverable 178 illustratively includes due date data 1794. Due date data 1794 is indicative of the due date of deliverable 178. A due date can be set by a manager or other user. In some examples, a due date is automatically generated based on its relationship to a greater project (e.g., a deliverable containing baseline code defining classes may have an earlier generated due date than a deliverable containing minor interface tweak tasks).

Deliverable 178 illustratively includes assignment data 1796. Assignment data 1796 is indicative of the user or team responsible for completing a given deliverable. For example, "hardware team" may be responsible for a deliverable titled "hardware driver for soundcard."

Deliverable 178 illustratively includes risk measure data 1798. Risk measure data 1798 is a value associated with the risk of deliverable. A risk can be indicative of the likelihood of deliverable being completed by its due date (e.g., from due date data 1794). For example, some risk measures include 'on track,' 'not on track,' 'at risk', etc.

Deliverable 178 illustratively includes progress data 1799. Progress data 1799 is indicative of the completion progress of the deliverable. For example, progress may be measured in a percentage (e.g., 10%, 20%, 90%, etc.) or can be measured in different categories (e.g., started, in progress, near completion, etc.).

Deliverable 178 illustratively includes owner data 1800. Owner data 1800 is indicative of the owner of deliverable 178. An owner indicated by owner data 1800 can be responsible for creating deliverable 178 and or ensuring that deliverable 178 is completed by its due date 1794. In some cases, the owner indicated by owner data 1800 is the only user able to change or modify any of the components of deliverable.

Deliverable 178 illustratively includes link data 1802. Link data 1802 is indicative of the relationships of a deliverable with other deliverables. As shown, a link can be in one of several different categories. As indicated by block 1804, deliverable can be linked to another deliverable as consuming from the other deliverable (e.g., the given deliverable is dependent upon another deliverable). As indicated by block 1806, the deliverable can be linked to another deliverable as producing for another deliverable (e.g., another deliverable is dependent on the given deliverable). As indicated by block 1808, a deliverable can be linked to another deliverable as being related to the other deliverable (e.g., while the deliverables are not dependent upon one another, they share similar dependencies or are similar in some other way such as having a similar title, description, assigned to the same or similar team, etc.). Related links, in some instances, are generated automatically based on a detection of some similarity between deliverables. Of course, deliverable 178 can be related to another deliverable in some other way as well, as indicated by block 1810.

Turning back to FIG. 1A, deliverable system 126 illustratively exposes functionality to users 116 and 120 (such as through a front-end system) that allows users 116 and 120 to perform deliverable management operations, such as creating a deliverable, modifying a deliverable, deleting a deliverable, etc. For instance, a manager can create a task (e.g., deliverable 178) and assign it to a user or team of users (e.g., assignment data 1796). Deliverable system 126 illustratively can detect that, and, in response, automatically generates a record of that in data store 124 via data store interaction logic 142. As another example, a user may update the status data 1784 of a deliverable 178 in data store 124 via deliverable system 126. The status may be indicated by the status data 1784 corresponding to the deliverable record. For instance, when a user completes the deliverable, they can change the status data 1784 to indicate that the deliverable is completed.

In one example, dependency/risk and control system 104 detects dependencies between deliverables 178, in data store 124 of computing system 102. Dependency/risk and control system 104 can automatically construct a timeline identifying the various connections among the various deliverables 178 in the organization or tenant, with various control functionality. To illustrate these connections, the timeline may have nodes connected by edges. Each node in the timeline may represent a deliverable 178, and each edge may represent a dependency (or link represented by link data 1802) between deliverables 178 represented by the connected nodes. To complete these and other functions, dependency/risk and control system 104 includes dependency system 150, risk measure generator system 152, cross-system comparison logic 154, control signal generator 156, user interaction system 158, and can include other items as well, as indicated by 160. Dependency/risk and control system 104 illustratively includes processor(s)/server(s) 154 that can execute functionality of the logic components of the system.

Dependency system 150 illustratively accesses the data store 124, parses link data 1802 of the deliverables, and identifies connected deliverables in data store 124 and constructs a timeline where nodes in the timeline represent deliverables and edges in the timeline represent dependencies and risk among those deliverables.

Update trigger detection logic 162 detects when it is time to construct or update the timeline. This can be time-based, such as when an update interval runs, or it can be based on other criteria, such as a volume of dependencies that have been updated, a volume of new deliverables that are created, among other things. When the update trigger is detected, deliverable parsing logic 164 obtains the deliverables 178 in data store 124 and parses the data associated with each deliverable. For example, deliverable parsing logic 164 retrieves data on a plurality of deliverables 178 that includes the deliverable data (e.g., ID data 1780, title data 1782, status data 1784, link data 1802, etc.) Deliverable parsing logic 164 can also filter out deliverables that represent these that are not of interest to dependency/risk and control system 104. For example, deliverables that do not meet the criteria of a user selected filter.

Dependency generator logic 166 then uses the retrieved data to detect which deliverables are dependent, on, or otherwise connected with, each other. For example, if a software deliverable uses a hardware driver deliverable, dependency generator logic 166 detects the dependency of the software deliverable on the hardware driver deliverable. Dependency generator logic 166 can generate an indication of the dependency between the deliverables or a dependency tree indicative of a branching chain of dependencies among many deliverables. Timeline generator logic 174 then uses this information to generate a timeline as explained below and then controls data store 176 to store a representation of the timeline. User inputs are detected and timeline restructuring control operations are performed.

Timeline generator logic 174 constructs the timeline where nodes in the timeline represent the deliverables involved in the detected dependency tree, and edges in the timeline (which connect the nodes) represent dependency and risk between deliverables. For instance, if a first deliverable 178 has a dependency on a second deliverable 178, then one node in the timeline will represent the first deliverable 178 and another node in the timeline will represent the second deliverable 178. An edge connecting those two nodes will represent the dependency (or other link) between those two deliverables. This will be repeated for all of the deliverables of interest (e.g., for all deliverables that meet a user set filter or otherwise identified as of interest). Timeline generator logic 174 plots the nodes at a location along the timeline based on a date of interest for that node (e.g., a date of interest may be retrieved from due date data 1794, for example). Timeline generator logic 174 then controls data store 176 to store a representation of the timeline.

Risk measure generator system 152 can generate a risk measure or metric corresponding to each of the nodes in the timeline or edges in the timeline. Risk measure generator system 152 illustratively includes connection identifier logic 182, connection metric generator logic 184, inheritance processing logic 186, risk metric generator logic 188, and it can include a wide variety of other items 194.

Connection identifier logic 182 accesses a source of deliverables (e.g. data store 124) and identifies connections (e.g., from link data 1802) between the deliverables that influence risk of the deliverables. For example, connection identifier logic 182 can determine a connection based upon one deliverable being dependent upon another. As another example, connection identifier logic 182 can determine which deliverables a given team is producing for.

Risk metric generator logic 185 generates a risk metric for a connection, node, deliverable, team, project, etc. For example, deliverables that are behind schedule are considered to be at risk of not meeting their due date and deliverables that are very behind schedule are considered to be at a greater risk. In one example, risk metric generator logic 185 uses progress data 1799 in combination with a due date retrieved from due date data 1794 of a given deliverable 178 to calculate the risk of the deliverable. Risk metric generator logic 185 can utilize inheritance processing logic 186 to inherit risk from the deliverables, teams, etc. that a given item is consuming from, and aggregates these metrics to generate an overall risk metric for the item for which the risk metric is being completed. For example, if a team project is consuming from a deliverable that is at high risk, then the team project can also inherit this high risk (in some instances, regardless of the team's other progress).

Therefore, connection identifier logic 182 first identifies a number of edges that connect to each node. Connection metric generator logic 184 generates a connection metric, for each node, based upon the number of edges that connect to it. For instance, if a node under consideration has many edges that connect to it, it will have a greater connection metric than a node that has fewer edges connecting to it. Inheritance processing logic 186 generates an inheritance value for each node, based upon the connection metrics and risk metric scores of the nodes to which it is connected.

Risk metric generator logic 188 then generates a risk metric based upon the risk measure of the node and the metric inheritance value for each node. The risk metrics can be output to cross-system comparison logic 154 where the values for the various nodes in the timeline representing the organization to which deliverables 178 belong can be compared to values for nodes in timelines representing other projects, organizations or tenants. The results of those comparisons, along with the risk metrics generated by risk measure generator system 152, can be output to control signal generator 156. Control signal generator 156 illustratively generates control signals to control user interaction system 158 based upon those risk metrics. For instance, it can control notification logic 168 to automatically send certain communications to various users, based upon the risk metric generated for the node representing those deliverables. Control signal generator 156 can also generate control signals to control surfacing logic 198 to surface the information for an administrative user, or other users. Control signal generator 156 can also generate control signals to control dependency/risk and control system 104 to send certain communications to other systems 110, where they may be stored, or further processed.

User interaction system 158 surfaces a user interface, utilizing surfacing logic 175, for users 116 and 120 to interact with the systems of architecture 100. For example, user interaction system 158 can surface timelines stored in data store 176. User interaction system 158 includes user interaction detection and control logic 167, notification logic 168, deliverable selection logic 169, filtering logic 171, link setting logic 173, and surfacing logic 175. However, user interaction system 158 can include other items as well, as indicated by block 177.

User interaction detection and control logic 167 can detect user interactions. User interactions can include actuating user interface mechanisms (e.g., nodes, edges, filters, buttons, select dropdowns, etc.). In response to a user interaction user interaction detection and control logic 167 can control computing system 102 or computing system 104 to complete an action. For example, in response to a user actuating an edge, computing system 102 can modify link data 1802 of the deliverables, represented by the nodes that are connected to the actuated edge, to reverse the dependency between the deliverables. As another example, in response to a user actuating a filter select mechanism, user interaction detection and control logic 167 can control deliverable parsing logic 164 to retrieve deliverables in accordance with a newly selected filter and control timeline generator logic 174 to generate and display a new timeline.

Notification logic 168 can generate a notification to users 116 and 120. A notification can be indicative of a change in a deliverable 178. For example, when link data 1802 of a deliverable is changed, notification logic 168 can generate a notification of this change. Some examples of notifications are shown and described below with respect to FIGS. 10-11.

Other items of logic, such as logic deliverable selection logic 169, filtering logic 171 and link setting logic 173 allow a user to control the computing system. These will now be discussed.

Deliverable selection logic 169 can generate a user interface mechanism that a user 116 or 120, actuates to create a deliverable, select a deliverable, modify a deliverable, delete a deliverable, view information about a deliverable, etc. For example, actuating such a user interface mechanism can allow a user to generate a new deliverable. As another example, actuating such a user interface mechanism can allow a user to modify title data 1782 or progress data 1799. These are examples only.

Filtering logic 171 can generate user interface mechanisms that a user 116 or 120 actuates to filter the deliverables displayed in a timeline or surface, by some category or data set. For example, filtering logic 171 can filter a set of deliverables by risk measure data 1798 (e.g., only show deliverables that have a high risk metric). As another example, filtering logic 171 can filter a set of deliverables by project (e.g., only show deliverables that are in a given project).

Figure 7:
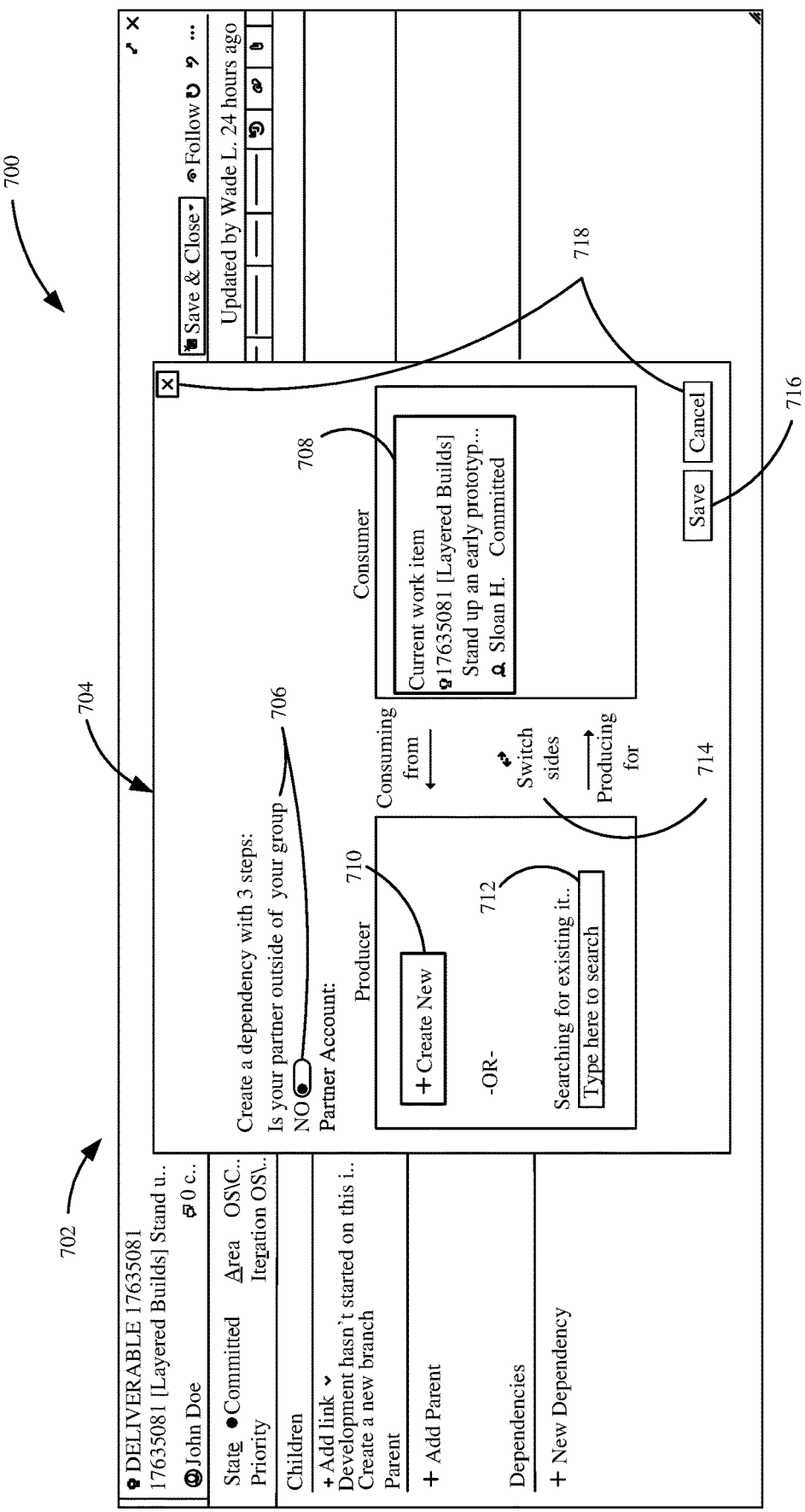
FIG. 7-8 are diagrams showing examples of dependency creation interfaces.
Figure 8:
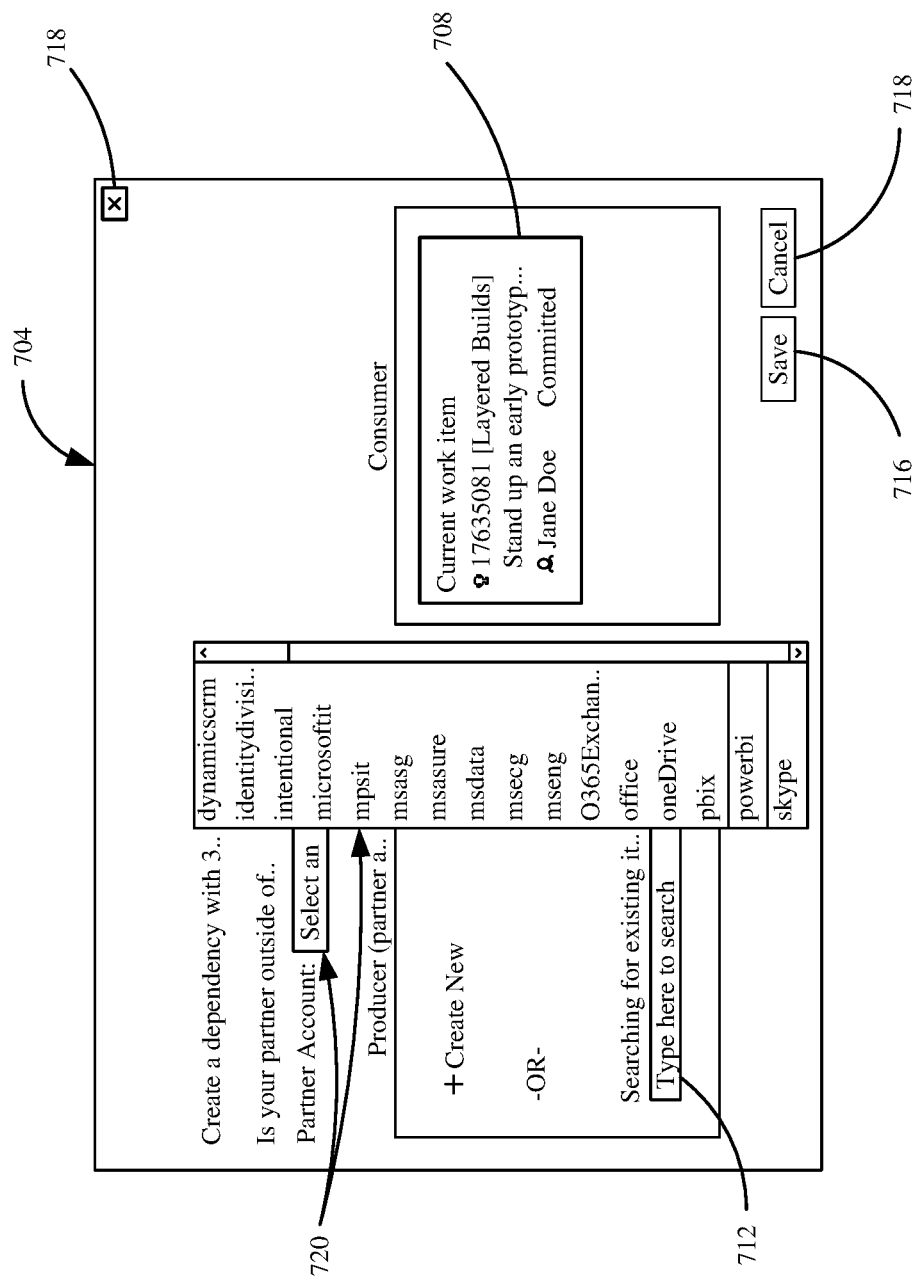

Link setting logic 173 can generate user interface mechanisms that a user 116 or 120 actuates to modify link data 1802 (e.g., create a link, select a link, modify a link, delete a link, view information of a link, etc). A link, for example may be a dependency between two deliverables. A user interface mechanism that can be actuated to control the system to create a link between deliverables is shown in FIGS. 7-8.

FIG. 1B is a block diagram showing one example of timeline generator logic 174 in greater detail. Timeline generator logic 174 generates an interface that includes a timeline representation. To create this timeline, timeline generator logic 174 includes pane generator logic 1000, node generator logic 1020, edge generator logic 1040 and summary generator logic 160. However, timeline generator logic 174 can include other items as well as indicated by block 1081.

Pane generator logic 1000 generates a timeline interface pane. To do this, pane generator logic 1000 illustratively includes timeline body generator logic 1001, chronological indicator generator logic 1002, chronological modifier mechanism generator logic 1004, subject matter indicator generator logic 1006 and subject matter sorting mechanism generator logic 1008.

Timeline body generator logic 1001 generates a timeline background that can include a surface where nodes and edges are displayed.

Chronological indicator generator logic 1002 generates a chronological indicator that indicates a time range of items generated on a timeline body. For example, chronological indicator generator logic 1002 generates a chronological indicator that includes a time range defining the scope of the timeline body.

Chronological modifier mechanism generator logic 1004 generates a user actuatable mechanism to shift the chronological indicator range. For example, a range may be showing the current week, however, actuating a mechanism generated by chronological modifier mechanism generator logic 1004 will control the system to shift the timeline range to the next or previous week.

Subject matter indicator generator logic 1006 generates an indication of the current subject matter (e.g. group, project, etc.). Nodes generated in the timeline background can be arranged based on the subject matter indicator generated by subject matter indicator generator logic 1006.

Subject matter sorting mechanism generator logic 1008 generates a user actuatable mechanism that is actuated to sort the items in a timeline background based upon the subject matter (e.g., team, project, group, etc.). For instance, the nodes in a timeline background can be sorted based on alphabetical group titles, after actuating a mechanism generated by subject matter sorting mechanism generator logic 1008.

Node generator logic 1020 generates nodes on a background generated by timeline body generator logic 1001. To accomplish this, node generator logic 1020 includes node body generator logic 1022, node location identifier logic 1024, label generator logic 1026, icon generator logic 1028, dependence count generator logic 1030, information mechanism generator logic 1032, class mechanism generator logic 1034, reverse mechanism generator logic 1035 and can include other items as well as indicated by block 1036.

Node body generator logic 1022 generates the body or shape of nodes on to the timeline generated by timeline body generator logic 1001. For example, node body generator logic 1022 can generate rectangular nodes that are indicative of a specific deliverable. Node body generator logic 1022 can generate these nodes at a point along the timeline at the due date of the deliverable represented by the node. For example, if a deliverable is due on July 4, the node will be generated at a point indicated by a chronological indicator (generated by chronological indicator generator logic 1002) that corresponds to July 4.

Node location identifier logic 1024 is utilized by node body generator logic 1022 to identify the proper location of the node to be generated. For example, node location identifier logic 1024 accesses due date data 1794 from datastore 124 to identify a proper location along the timeline background.

Label generator logic 1026 generates a label or title for each node generated by node body generator logic 1022. For example, label can be indicative of some identifying data of the deliverable represented by the node. For example, label generator logic 1026 can generate labels indicative of title data 1782, iteration data 1788, etc.

Icon generator logic 1028 can generate an icon for a node generated by node body generator logic 1022. For example, some nodes represent different types of deliverables (e.g., is identified by type data 1786). Accordingly, it may be beneficial to generate a different icon for each node that represents a different type of deliverable on the timeline background. For instance, a deliverable that relates to hardware can have an icon of a microchip, or a deliverable that relates to image processing may have an icon that is a camera. These are examples only.

Dependence count generator logic 1030 generates an indication of the account of dependence on a given node. Dependence count generator logic 1030 can access link data 1802 for each deliverable represented by a node and uses this data to calculate how many items are dependent upon the deliverable and generates an indication of the count. For example, a node that has six other nodes dependent upon it can have an indication that includes a number six.

Figure 6:
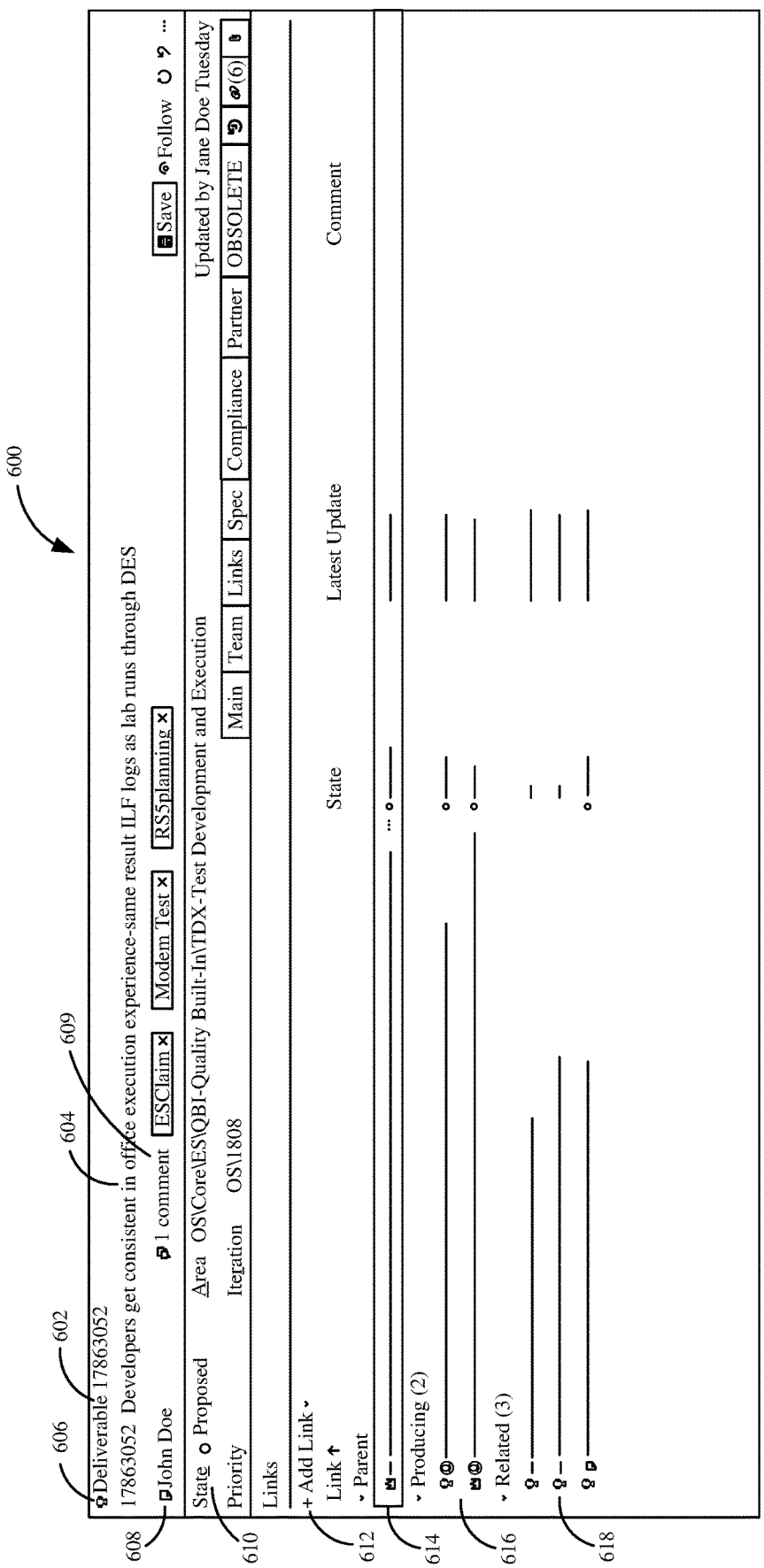
FIG. 6 is a diagram showing one example of an item information interface.

Information mechanism generator logic 1032 generates an information mechanism that can be actuated by the user to display an information interface that displays additional information on the deliverable represented by a specific node. For example, FIG. 6 represents an example of a detailed information interface. Information mechanism generator logic 1032 can be integrated into the node body generated by node body generator logic 1022. For example, clicking or otherwise actuating a node can generate a greater detail information page for the deliverable represented by the node. In another example, information mechanism generator logic 1032 generates an information mechanism on an edge between two nodes.

Figure 3:
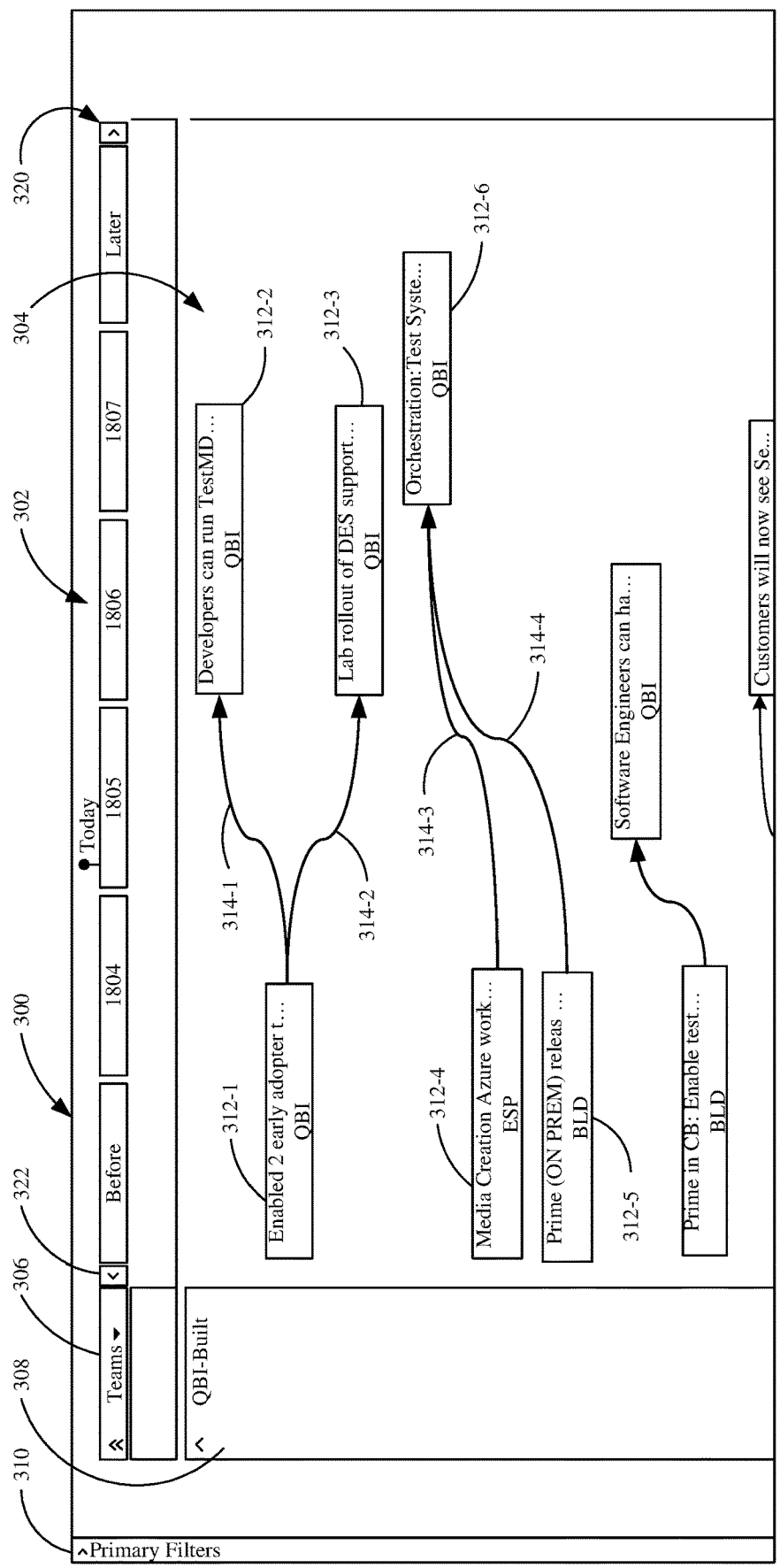
FIGS. 3, 4, 5A, 5B, 5C and 5D are diagrams showing examples of timeline interfaces.

Collapse mechanism generator logic 1034 generates a user interface mechanism that is actuates to collapse several nodes into a set of fewer nodes. For example, FIG. 3 shows nodes as individual nodes and after a collapse mechanism has been actuated, an interface similar to FIG. 4 may be displayed in place of FIG. 3. In some examples, collapse mechanism generator logic 1034 collapses some but not all nodes.

Reverse mechanism generator logic 1035 generates a mechanism that is actuated to reverse the dependence between nodes and the deliverables they represent. For example, when actuated, reverse mechanism generator logic 1050 accesses and modifies the link data 1802 of the deliverables, and in some examples, changes due date data 1794 of the deliverables. In one example, reverse mechanism generator logic 1035 utilizes an actuation of the node to reverse the dependency between nodes. For instance, moving the node to a new location can actuate the reverse mechanism to reverse dependencies of some connections. Some examples of reverse mechanisms are indicated in FIGS. 5A-5D.

Edge generator logic 1040 generates edges indicative of links between deliverables (represented by nodes). To do this, edge generator logic 1040 includes node identification logic 1042, dependency direction logic 1044, risk indication generator logic 1046, dependence count indication generator logic 1048, reverse mechanism generator logic 1050 and can include other items as well, as indicated by block 1054.

Node identification logic 1042 accesses link data 1802 corresponding to the nodes that represent a deliverable and determines whether there is a connection between these nodes (e.g. deliverables that these nodes represent). If there is a connection between the deliverables, then node identification logic 1042 determines that an edge between nodes representing the deliverables should be generated.

Dependency direction logic 1044 generates an indication indicative of the direction of dependency between two nodes (e.g., the deliverables the nodes represent). Dependency direction logic 1044 can access link data 1802 for the deliverables and determine which way the dependency flows. For example, dependency direction logic 1044 determines the dependency direction based upon the due date data 1794 of the deliverables. A dependency direction indication can be generated on the edge between two nodes. For instance, the dependency direction indicator may include an arrow pointing to the dependent node.

Risk indication generator logic 1046 can generate an indication of risk (a risk measure) corresponding to the link between nodes. For instance, risk indication generator logic 1046 can generate an indication that is a color of the generated edge. In another example, risk indication generator logic 1046 can generate an edge of a different thickness based upon the risk measure corresponding to the connection.

Dependence count indication generator logic 1048 can generate an indicator of the dependence count between two nodes. For instance, if two nodes are connected and represent several different deliverables, dependence count indication generator logic 1048 can generate an indication of the number of deliverables that are present in each node.

Reverse mechanism generator logic 1050 generates a mechanism that is actuated to reverse the dependence between two nodes and the deliverables they represent. For example, when actuated, reverse mechanism generator logic 1050 accesses and modifies the link data 1802 of the deliverables, and in some examples, changes due date data 1794 of the deliverables. Some examples of reverse mechanisms are indicated in FIGS. 5A-5D.

Summary generator logic 1060 generates a summary of the nodes in timeline background. To generate this summary, summary generator logic 1060 includes identifier generator logic 1062, status generator logic 1064, risk status generator logic 1066 and can include other items as well, as indicated by block 1068.

Identifier generator logic 1062 identifies the plurality of nodes in a timeline background. After the nodes are identified they are collapsed into a singular node based upon a characteristic of the deliverable (e.g., in FIG. 4 the nodes have been collapsed based on time and status). In other examples, identifier generator logic 1062 can identify groups of nodes based upon their subject matter indicator (generated by subject matter indicator generator logic 1006). In other examples, identifier generator logic 1062 can group the nodes based on a different characteristic as well.

Status generator logic 1064 separates the identified nodes based on their status. For example, nodes that are in a completed status may be separated from nodes that are in a cut status or propose status.

Risk status generator logic 1066 can generate an indication of the risk associated with a given set of nodes. For instance, a group of nodes that are at risk can be colored red and a group of nodes that are at low risk can be colored green.

Figure 2:
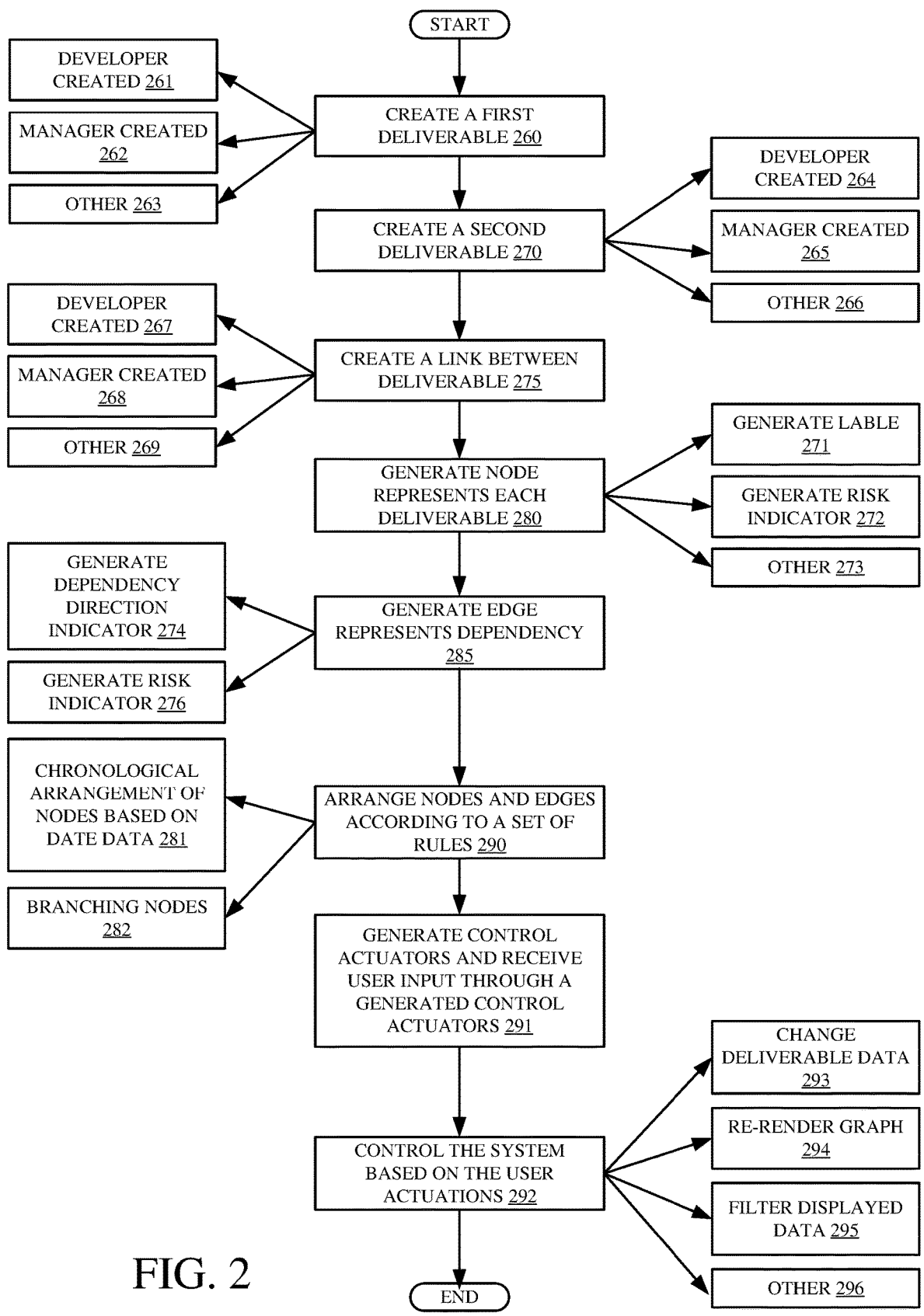
FIG. 2 is a flow diagram showing one example of the operation of the architecture illustrated in FIG. 1 in generating and displaying a dependency risk timeline.

FIG. 2 is a flow diagram showing one example of an operation of displaying a set of deliverables. Operation 201 begins at block 260 where a first deliverable is created. A developer can create a deliverable, as indicated by block 261. For example, a developer that discovers a bug in a deliverable can create a task/deliverable indicative of correcting the bug.

A manager can create a deliverable, as indicated by block 262. For example, a manager that is in charge of a project can create a team, deliverable, item, etc. Deliverables may be created in other ways as well as indicated by block 263. For example, a deliverable may be automatically created based on the creation of another deliverable. For instance, a deliverable relating to a specific display device may generate a another deliverable related to a hardware driver to run the display device. In another instance, when an error is detected, a deliverable item may be created, indicative of fixing the bug that created the error.

Operation 201 proceeds at block 270, where a second deliverable is created. The second deliverable can be created in similar ways as the first deliverable. For example, a developer can create a deliverable, as indicated by block 264. As another example, a manager can create the deliverable, as indicated by block 265. However, the deliverable can be created in another way as well, as indicated by block 266.

Operation proceeds at block 275 where a link is created between the deliverables. A developer can create the link, as indicated by block 267. For instance, a developer may know that the deliverable they are working on is dependent upon another deliverable and can control the system to make the connection. For example, the developer actuates a user interface mechanism, generated by the system, to control the system to make the link.

A manager can create the link, as indicated by block 268. For instance, a manager, that is managing a project that consists of several deliverables, knows that one deliverable is required for another deliverable to be completed. Accordingly, the manager could control the system to create a link to show the first deliverable is dependent on the second deliverable.

A link can be created between deliverables in other ways as well, as indicated by block 269. For example, a link between the deliverables can be automatically generated when it is determined that one deliverable must be completed before another deliverable can be completed. For example, assume that a first deliverable is built on an API, where the API is also a second deliverable. In that case, the second deliverable must be completed first, and hence the system can identify the first is dependent on the second and modify the records to reflect that.

Operation 201 proceeds at block 280, where node generator logic 200 generates a node. Generating a node may involve generating a number of components. Label generator logic 206 can generate a label for the node, as indicated by block 271. For example, a label can indicate a title of the deliverable, a team responsible for the deliverable, or can indicate other characteristics of the deliverable as well.

As indicated by block 272, when generating the node, a risk indicator can be generated by risk indication generator logic 234. A risk indicator can be indicative of a current risk status of the item represented by the node (e.g., whether a deliverable is on track or whether the items the deliverable depends on are on track.)

Generating a node, in block 280, can comprise other steps as well as indicated by block 273. For example, icon generator logic 208 can generate an icon for the node. As another example, dependency count generator logic 210 can generate an indicator of either the number of items dependent on the node, or the number of items the node is dependent on.

Operation 201 proceeds at block 285 where edge generator logic 202 generates an edge between the two nodes. Generating an edge between two nodes can comprise generating a variety of components.

As indicated by block 274, while generating the edge, a dependency direction indicator can be generated by dependency direction logic 232. For example, a dependency direction indicator can include an arrow pointing from the producing node to the consuming node. In other examples, the dependency direction indicator can be another shape other than an arrow.

As indicated by block 276, generating an edge can also include risk indication generator logic 234 generating a risk indicator. A risk indicator can be indicative of the risk status associated with the connection represented by the edge. For example, a risk indicator can be generated on an edge between two nodes. In some examples, a node represents more than one deliverable and an edge between such a node indicates that more than one node has a relationship with the other connecting node.

Operation 201 proceeds at block 290, where the nodes and edges are arranged according to a set of rules. Based on one set of rules, the nodes and edges are arranged in a timeline.

The nodes and edges may be arranged chronologically on the timeline based on their date, as indicated by block 281. For instance, nodes that have an earlier date are positioned leftward while nodes with a later date are positioned rightward. As indicated by block 282, some nodes may be connected to multiple other nodes in a branching fashion. For example, some of the nodes shown in FIG. 3, discussed in greater detail below, are connected in a branching fashion.

Operation 201 proceeds at block 291 where control actuators or user input mechanisms are created, and user input is received through the generated user input mechanisms. User input can be an actuation of one or more user input mechanisms that are displayed by surfacing logic 175. User input mechanisms can include filter mechanisms, dependency reversal mechanisms, information request mechanisms, modify node/edge mechanisms, delete nodes/edge mechanisms, create node/edge mechanisms, etc.

Operation 201 proceeds at block 292 where the system is controlled based on the user input/actuations. Examples of system control based on the user input are indicated by blocks 293-296.

As indicated by block 293, dependency system 150 can change deliverable data. For instance, changing deliverable data can include creating a new deliverable 178 in datastore 124 or deleting a deliverable 178 in data store 124. In another instance, changing deliverable data can include modifying a data component of a deliverable 178 (e.g., those shown in FIG. 1C).

As indicated by block 294, in response to user actuation, timeline generator logic 174 can recreate and re-render a timeline. This action can be taken after, for example, a user changes a dependency. Re-rending the timeline, in this instance, would show an updated location of one or more nodes and/or edges.

As indicated by block 295, in response to user actuation, deliverable parsing logic 164 can modify the deliverables displayed based on a filter change by the user actuation. After a filter change, the timeline can also be recreated or re-rendered to remove any data that does not meet the new filter settings.

As indicated by block 296, the system can be controlled in other ways as well. For example, assume a user actuated an interface mechanism to request more information on a node. In response to this actuation, user interaction system 158 can generate a deliverable information pane, one example of which can be described with respect to FIG. 6.

FIG. 3 is a diagram showing one example of a timeline interface. Timeline pane 300 includes a variety of components that represent a timeline of deliverables.

Chronological indicator 302 is indicative of the range of deliverables being shown on timeline background 304. Timeline background 304 is the surface upon which nodes 312 are generated and displayed to a user. Nodes 312 that are displayed on timeline background 304 are chosen based their due date being within the range of chronological indicator 302 and their subject matter being within the filters identified by group identifier in the weight and sorting mechanism 306.

Sorting mechanism 306, as shown, indicates that 'teams' are the subject matter identified by group identifier 308 is being sorted by team in reverse alphabetical order (e.g. Z to A). Sorting mechanism 306 can be actuated to change the sorting characteristic of the nodes displayed on timeline background 304. Further the nodes displayed on timeline background 304 can be sorted by filter mechanism 310. Filter mechanism 310 can include filters such as projects, teams, iterations, etc. Filter mechanism 310 can filter the nodes displayed on timeline background 304 based on any data sets in a deliverable 178.

Node generator logic 1020 displays a plurality of nodes 312 onto timeline background 304. As shown node 312-1 is connected to nodes 312-2 and 312-3 by edge 314-1 and edge 314-2. Edges 314 are generated by edge generator logic 1040 to indicate a connection between the deliverables represented by the nodes which are connected by the given edge 314.

Nodes 312 are generated at their positions (by node location identifier logic 1024) corresponding to due date data 1794 of the deliverable that they represent. For example, nodes 312, as shown are displayed at points based upon their due date data 1794.

Chronological modifier mechanisms 321 and 3022 allow the chronological indicator 302 to shift to a different time range. Shifting to different time range may change the deliverables are displayed on timeline background 304.

Figure 4:
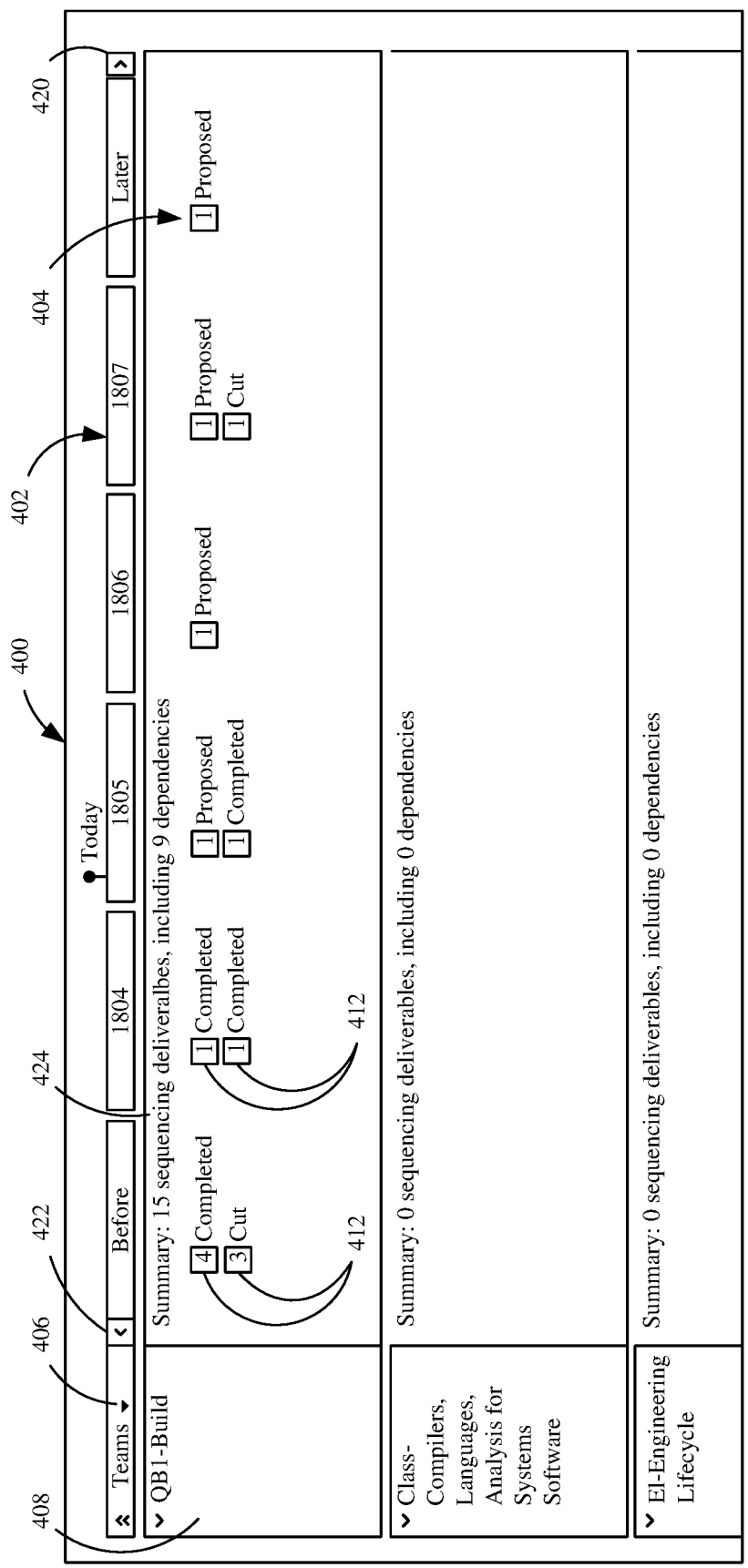

FIG. 4 is a diagram showing one example of a summary timeline interface. Timeline pane 400 includes similar items to those in FIG. 3 and the items are similarly numbered (e.g., timeline background 304 in FIG. 3 is similar to timeline background 404 in FIG. 4.) One difference between FIG. 3 and FIG. 4 is that the nodes of FIG. 3 have been collapsed into summary nodes 412 of FIG. 4. As shown, the nodes are still located at the same time according to chronological indicator 402, however there is only one node per group of nodes with similar status data 1784. As shown, there are four completed and three cut nodes at the "1803" time in timeline background 304 (some of which are hidden from view in FIG. 3). A timeline summary interface can be useful in quickly viewing the upcoming deadlines of a plurality of deliverables and the status of those deliverables. For instance, if every deliverable with a due date prior to the current date has a status of completed or cut, a user need not worry. However, if some nodes have the status of proposed, in progress, etc. then this node represents a deliverable that is past its due date.

FIG. 5 is a diagram showing a timeline pane that allows a user to reverse a connection between two nodes. As shown node 504 precedes node 506 on the chronological timeline (e.g. as shown by chronological indicator 502). However, edge 508 shows that node 504 is dependent on node 506. This can be problematic when a node (a child node) that is dependent upon another node (a parent node) has a due date before the parent node. Accordingly, a user may want to change the dependency between these two nodes such that, the node that is due earlier in time is producing for the node later in time. In the shown example, reverse mechanism generator logic 1050 has created a reverse mechanism on edge 508. Indicator 510 is indicative of a user interaction in which a user actuates this reverse mechanism generated by reverse mechanism generator logic 1050. The result of this user interaction is shown in FIG. 5B. FIG. 5B shows a similar timeline pane as FIG. 5A, however in FIG. 5B, edge 508 has been updated to show that node 506 is now dependent upon node 504 (e.g., the directionality of the edge is reversed.) In some examples, not only is edge 508 updated but logic 1050 updates the deliverable data in data store 124 to show the reversal.

Figure 5A:
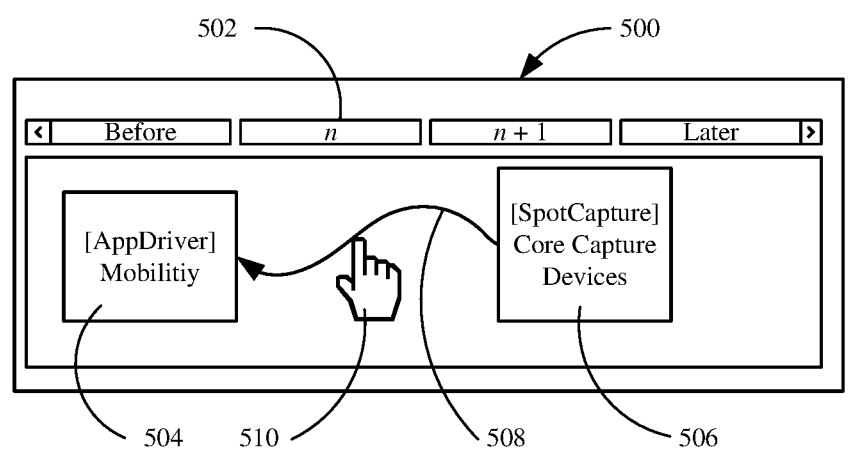
Figure 5B:
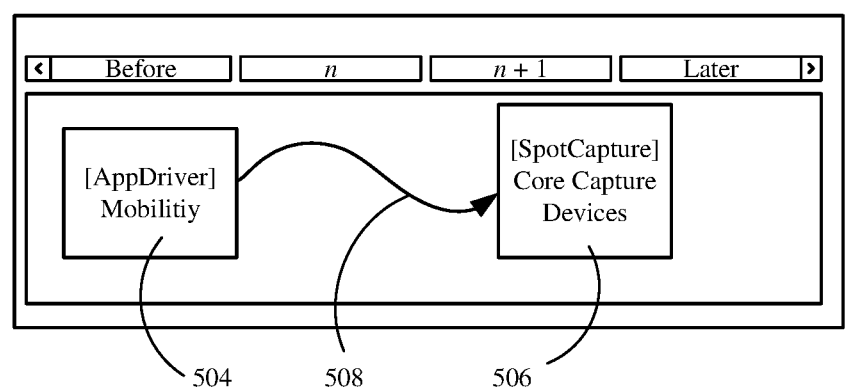
Figure 5C:
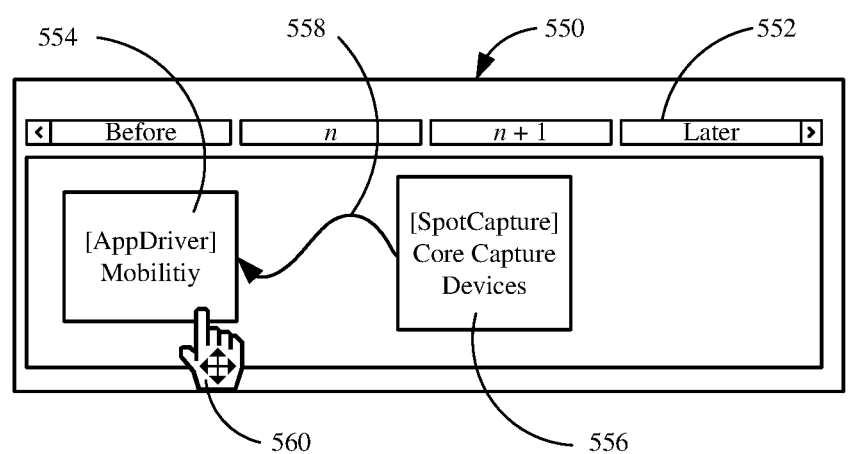
Figure 5D:
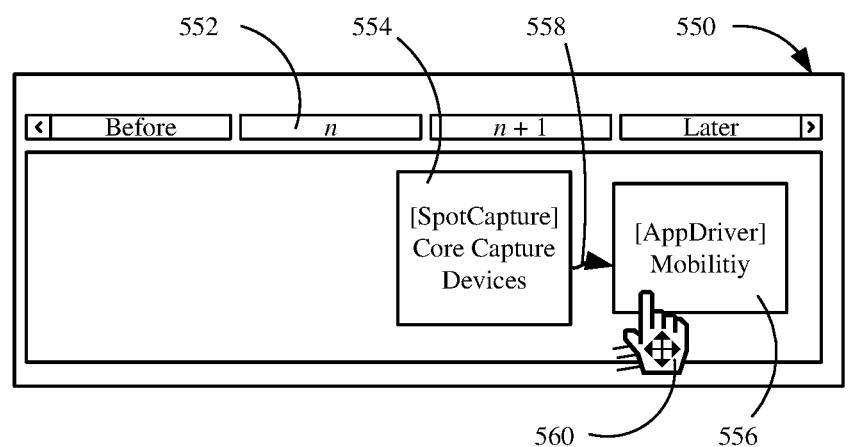

FIG. 5C is a diagram showing a timeline interface 550. Interface 550 is similar to that of FIG. 5A, however the reverse mechanism generated by reverse mechanism generator logic 1050 is generated on node 554. As shown, node 554 is dependent upon node 556, however node 556 before is due before node 554. This is problematic because node 554 (due to its dependence) cannot be finished before node 556. Indication of user action 560 is indicative of a user actuating a reverse mechanism generated by reverse mechanism generator logic 1050. To actuate a reverse mechanism a user has clicked and dragged node 554 to the opposite side of node 556 on the timeline view, or otherwise actuated the reverse mechanism coupled to node 554. The result of this actuation is shown in FIG. 5D. FIG. 5D is similar to that of FIG. 5C; however, node 554 has been shifted to a later due date than node 554. When a user actuates node 554 to this later position, the due date data 1794 of the deliverable represented by the node is also automatically updated.

In one example, some or all of the displayed items are actuators that can be actuated by the user to perform one or more functions. Clicking on or actuating a node, for instance, may bring up an information interface corresponding to that node. FIG. 6 shows one example of this.

FIG. 6 is a diagram showing one example of a user interface for a deliverable information interface 600 that is displayed when the user actuates a node representing a deliverable. Interface 600 includes a label 602 that identifies the deliverable or team represented by the node that was actuated and that is the subject of interface 600. Icon 606 is an icon for the identification of the deliverable or team that is the subject of interface 600. Label 604 is indicative of a description of the subject of interface 600.

User indicator 608 is indicative of the current user or user assigned as a contact for the item of interest in interface 600. Commenting mechanism 609 initiates an interface where comments may be given or viewed.

Status indicator 610 is indicative of the status of the item of interest in interface 600. For example, status indicator 610 shows that the status of the item of interest, is proposed.

Link creation mechanism 612 can be actuated by a user to generate an interface for creating a link between the current item and another item. For example, clicking on link creation mechanism 612 opens an interface, such as the one shown in FIG. 7. However, clicking on status indicator 610 may initiate a different type of linking creation system or interface as well.

Parent mechanism 614 allows a user to select or view a parent of the current item (e.g., a parent may be an item that is producing for the current item). Child mechanisms 616 allow a user to change or view the items that the current item is producing for. For example, there are two items shown that are consuming from the current item.

Related items mechanism 618 allows a user to view or edit items that are related to the current item. For example, related items may be items that are not dependent upon one another, but share similar dependencies or relations. Viewing related items may allow a user to identify a previously missed dependency. For instance, in a large project some related items may actually be dependent upon one another, but not manually identified as such.

FIG. 7 is a diagram showing an interface 700 for creating a dependency between two items. Interface 700, as shown, includes an information pane 702 (similar to the interface of FIG. 6) and a create link pane 704. Create link pane 704 can be used to create a link or dependency between items. Create link pane 704 includes an external group mechanism 706 that toggles an interface that displays items outside of the current group. As shown, external group mechanism 706 is in the negative status. Actuating external group mechanism 706 into a positive status can generate an interface similar to interface shown in FIG. 8.

Link pane 704 includes a deliverable mechanism 708 where a deliverable or a current item has been preselected. For example, since the create link pane was generated from information pane 702 that was indicative of deliverable 17635081, deliverable mechanism 708 has been prefilled with deliverable 17635081. In other examples, deliverable mechanism 708 has not been preselected and instead is replaced by deliverable mechanism 710. Deliverable mechanism 710 allows a user to select, delete, or create a new deliverable that currently does not exist. Select deliverable mechanism 712, instead, allows a user to select a deliverable that currently exists. For example, select deliverable mechanism 712 can be a drop-down menu where a list of selectable deliverables is populated. In another example, select deliverable mechanism 712 includes an auto complete select user interface mechanism.

Reverse mechanism 714 allows a reversal of dependency between the selected items. For example, the items on the left are considered the producers and the items on the right are the consumers (e.g., the items on the right-hand side are dependent upon the items on the left-hand side). When reverse mechanism 714 is actuated it reverses the dependency roles. For example, the consumer will be on the left and the producer will be on the right. It also controls the system to modify the records (e.g. link data 1802) corresponding to the two deliverables to indicate the changed dependency.

Create interaction mechanism 716 can be actuated for a creation of the chosen items. Cancellation mechanism 718 can be actuated to a cancellation of link creation, regardless of the data entered.

FIG. 8 is a diagram showing one example of an interface 700 for link creation. Interface 800 is similar to the interface of FIG. 7. However, external group mechanism 706 has been actuated. Link pane 704 includes group select mechanism 720. Group select mechanism 720 allows a user to select from a group of deliverables that are different than the group that the user belongs to. This may be especially useful when developing in a network of a variety of different applications, projects, etc. Previous attempts to create dependencies between items lacked the ability to link between different groups.

Figure 9:
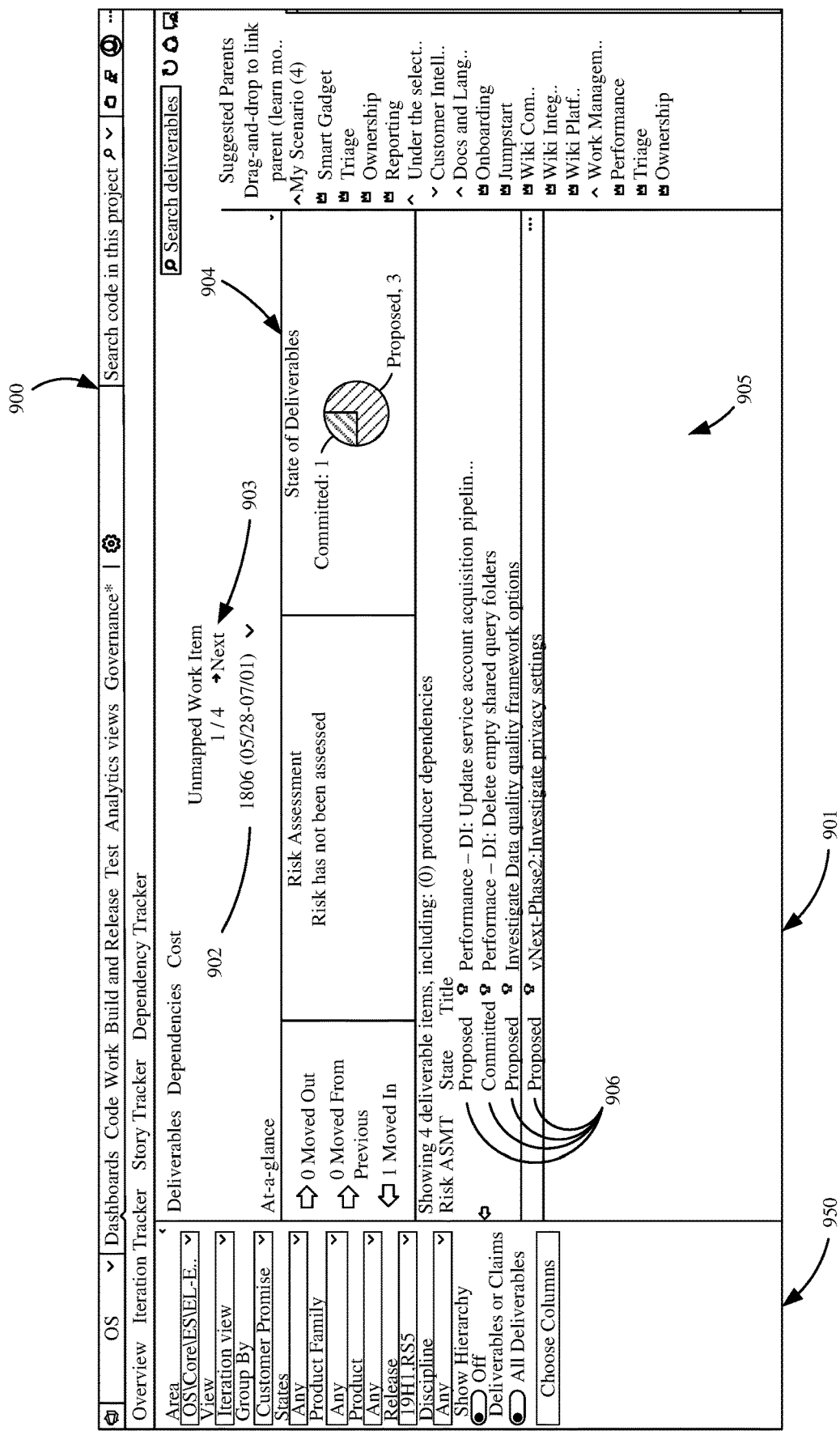
FIG. 9 is a diagram showing one example of an item information interface.

FIG. 9 is a diagram showing an example user interface displaying unmapped item information. Interface 900 includes an unmapped items pane 901. Unmapped items pane 901 includes labels 902. Labels 902 can be indicative of the current work item title, identifying number, associate team or project, etc. Unmapped items pane 901 also includes iterator mechanism 903. Iterator mechanism 903 allows a user to iterate through all the various unmapped work items (given the current filter setting chosen in filter pane 950). As shown, iterator mechanism 903 indicates the current item is item 1 of 4 and includes a mechanism to iterate to the next item (e.g., items 2-4). In other examples iterator mechanism 903 can comprise a different type of iterator mechanism.

Unmapped items pane 901 includes a status chart 904. Status chart 904 shows the status of all the unmapped deliverables (given the filter setting set and filter pane 950). Status chart 904 includes a pie chart showing the different statuses of the deliverables. As shown by the pie chart, one deliverable is committed, and the other three deliverables are proposed. In another example, status chart 904 can include a different chart than a pie chart, as well. Using a chart to display this information can be helpful in assessing the status of a project. For example, in the past, viewing a large project consisting of many work items was complicated, as many items were not properly linked to one another.

Unmapped items pane 901 includes a list view 905. List view 905 is a list view of all the unmapped items ("all" unmapped items that meet the selected filter criteria in filter pane 950). As shown list view 905 includes several work items 906. Work items 906 are each represented by a row with columns indicating a risk assessment, status, logo, and title. In other examples, the row representing work item 906 can include other information as well. Actuating a work item 906 may direct a user to an information interface of the given work item (such as the interface shown in FIG. 6), a risk timeline centered on the given item (such as the interfaces shown in FIGS. 3-5) or can allow a user to edit the work item.

Figure 10:
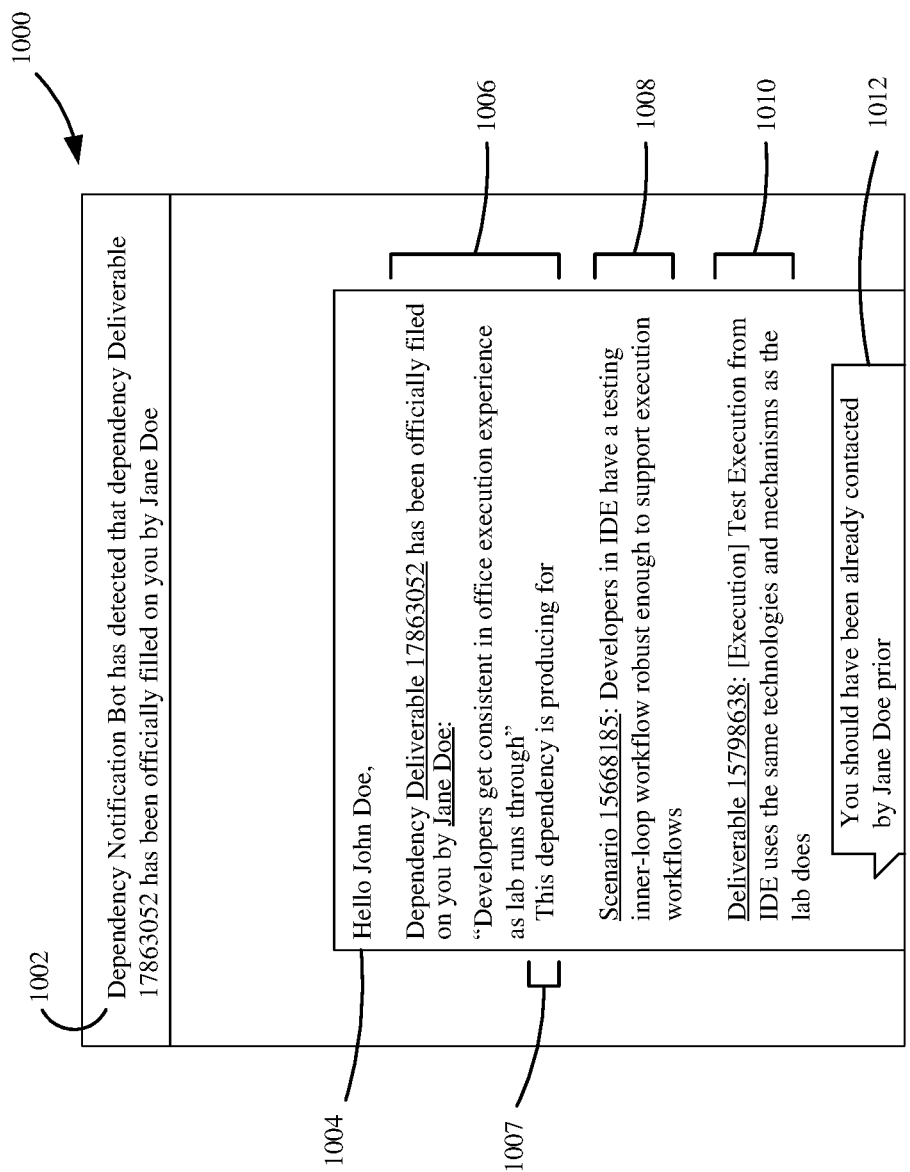
FIGS. 10-11 are diagrams showing examples of user notification interfaces.

FIG. 10 is a diagram showing one example of a notification. Notification 1070 includes a header 1072 and body 1074. Header 1072 is indicative of the subject of the notification. For example, in notification 1070, the subject of notification 1070 is that a dependency has been filed on a work item or team that the user receiving notification 1070 is working on. The dependency has been filed by a user named "Jane Doe." For example, Jane Doe could have used the interface of FIGS. 7-8 to generate a link between items/deliverables. When this link was made, notification logic 168 may have generated notification 1070 to notify any party associated with the linked items/deliverables.

Body 1074 is indicative of greater detail of the notification 1070. As shown, body 1074 includes subject item indication 1076, target item indication 1078, target item indication 1010 and workflow indication 1012.

Subject item indication 1076 is indicative of the subject item/deliverable of notification 1070. For example, as shown, dependency deliverable 17863052 is the subject item of notification 1070. The title of deliverable 17863052 is "Developers get consistent in office execution experience as lab run through." This work item/deliverable is a scenario work item, which means the work item is a goal for developers to get an in-office execution experience that is consistent with a typical lab run through.

Action indication 1077 is indicative of the action being completed on or involving the subject item (indicated by subject item indication 1076). As shown, action indication 1007 indicates that the subject item (indicated by subject item indication 1076) is producing for the target items (indicated by target item indication 1078 and target item indication 1080).

Target item indication 1078 is indicative of a target item which is somehow related to the action on subject item. For example, as shown, the target item (indicated by indication 1078) is consuming from the subject item (indicated by indication 1076). Target item indication 1078, as shown, represents an item/deliverable that is a scenario, its identified by number 15668185 and is titled "Developers in IDE have a testing interloper workflow robust enough to support execution workflows."

Target item indication 1010 is also indicative of a target item which is somehow related to the action on subject item. For example, as shown, the target item (indicated by indication 1080) is consuming from the subject item (indicated by indication 1076). Target item indication 1080 is indicative of a deliverable/item identified by number 15798638 and is titled "Test execution from IDE uses the same technologies mechanisms as lab does."

Workflow indication 1012 is indicative of a workflow notification to the user receiving notification 1070. Workflow indication 1012, as shown, is indicative of the user being previously notified of this notification 1070. Workflow indication 1012 can be useful in facilitating in-person communication of electronic matters.

Figure 11:
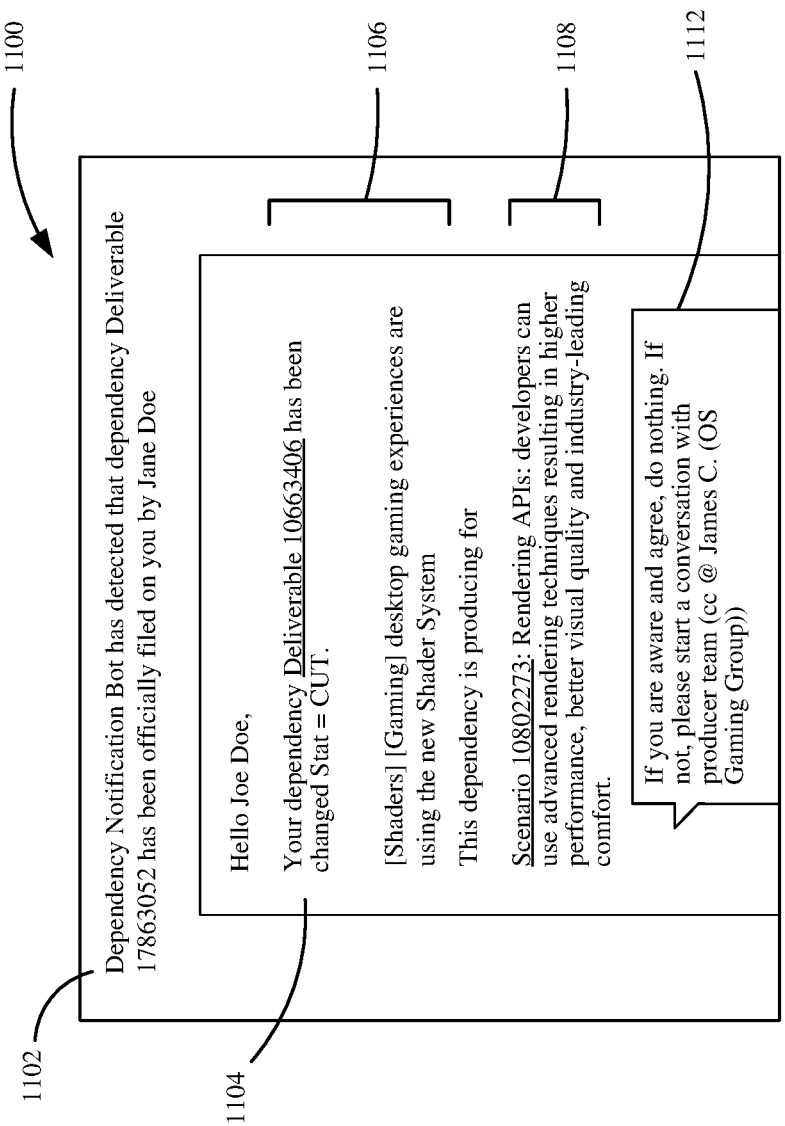

FIG. 11 is a diagram showing one example of a notification 1100. Notification 1100 includes a header 1102 and a body 1104. Header 1102 is indicative of the subject of notification 1100. For example, in notification 1100, the subject of notification 1100 is that a work item has been changed to the status of "cut." The status change has been filed by a user named "Jane Doe." For example, Jane Doe could have used status indicator 610 of FIG. 6 to change the status of the deliverable. When this status was changed, notification logic 168 may have generated notification 1100 to notify any party associated with the item, whose status has been changed, or an item related to that item.

Body 1104 is indicative of details of the matter of notification 1100. Body 1104 includes subject item indication 1106, possible effect indication 1108 and workflow indication 1112.

Subject item indication 1106 is indicative of the subject item of notification 1100. In this instance, the subject item is deliverable 10663406 and its status has been changed to "cut." As shown, the subject item is titled shooters bracket that gaming bracket that desktop gaming experiences are using the new shader system.

Possible effect indication 1108 is indicative of a possible effect of the notification 1100. For example, since the subject item has been changed to a status of cut (e.g., changing status data 1784), the items that are dependent upon the now cut work item may also be "cut" (e.g., changing status data 1784). Possible effect indication 1108 alerts the user of this possible effect which may allow a user to act in the scenario (e.g., also cut the dependent item or change the dependency of the item).

Workflow indication 1112 is indicative of a potential workflow scenario. Workflow indication 1112 is indicative of an indication to contact another user in-person. Workflow indication 1112 can be useful in facilitating in person communication or team collaboration on the matter.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
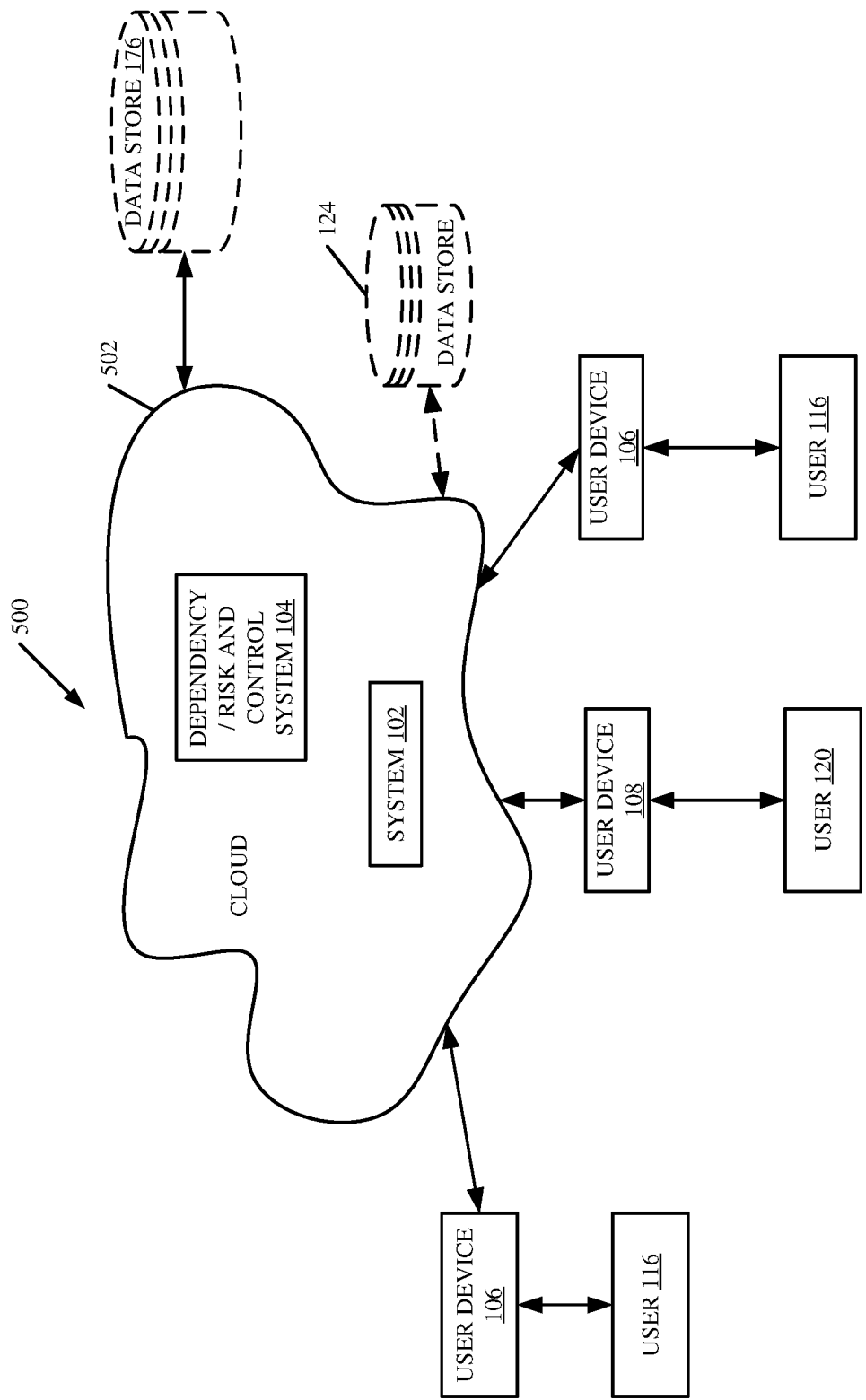
FIG. 12 is a block diagram showing one example of the architecture illustrated in FIG. 1, deployed in a cloud computing architecture.

FIG. 12 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 12, some items are similar to those shown in FIG. 12 and they are similarly numbered. FIG. 12 specifically shows that computing systems 102, dependency/risk and control system 104, and 110 can be located in cloud 1202 (which can be public, private, or a combination where portions are public while others are private). Therefore, users 116 and 120 use user devices 106 and 108 to access those systems through cloud 1202.

FIG. 12 also depicts another example of a cloud architecture. FIG. 12 shows that it is also contemplated that some computing systems can be disposed in cloud 1202 while others are not. By way of example, data stores 124, 176 can be disposed outside of cloud 1202, and accessed through cloud 1202. In another example, dependency/risk and control system 104 (or other items) can be outside of cloud 1202. Regardless of where they are located, they can be accessed directly by the other items through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
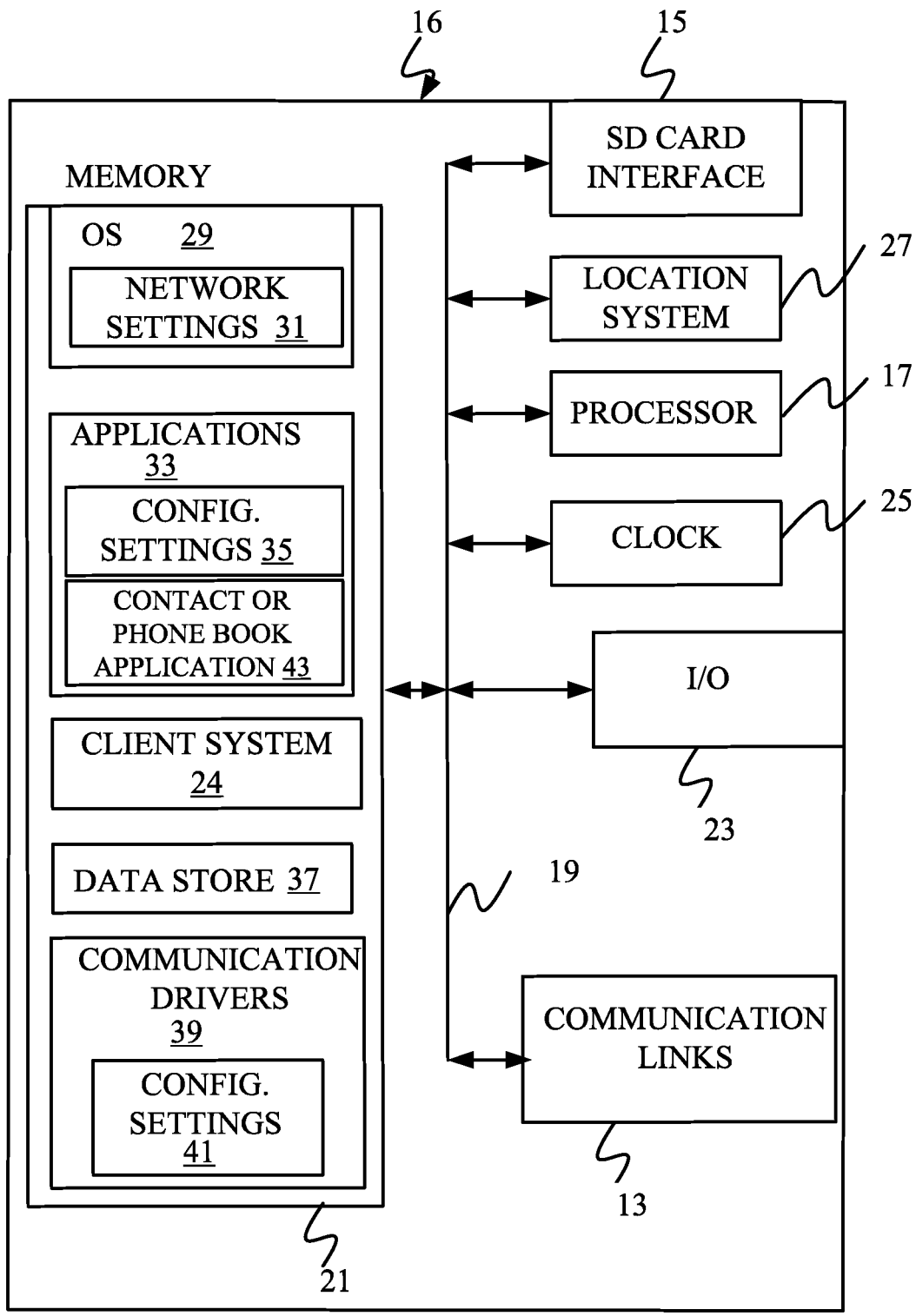
FIGS. 13-15 show examples of mobile devices that can be used in the architectures shown in the previous figures.
Figure 14:
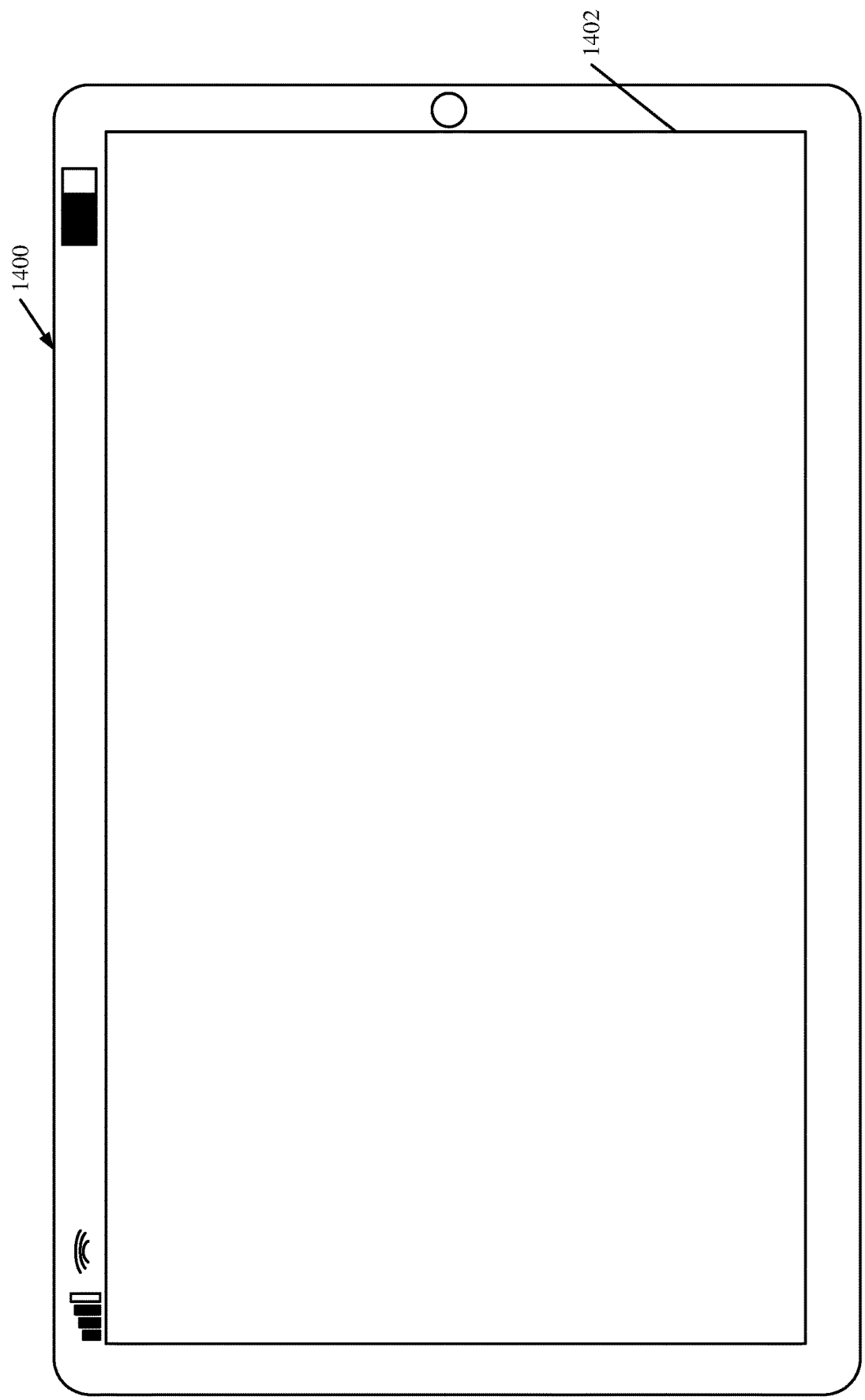
Figure 15:
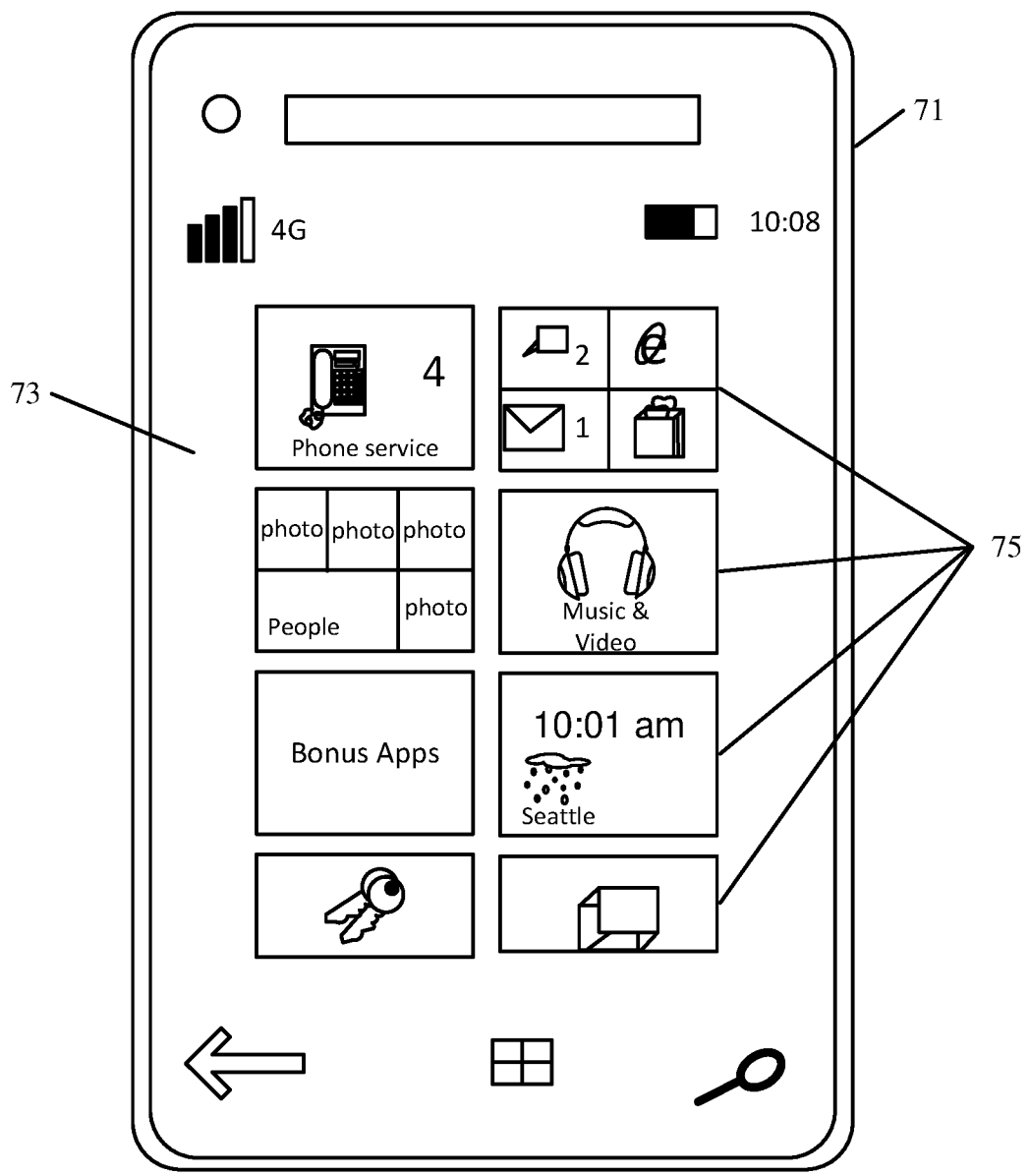

FIG. 13 is a simplified block diagram of one illustrative example of a handheld or mobile computing device that can be used as a user's or client device 16, in which the present system (or parts of it) can be deployed. FIGS. 14-15 are examples of handheld or mobile devices.

FIG. 13 provides a general block diagram of the components of a client device 16 that can run components of computing system 102 or user devices 106, 108 or dependency/risk and control system 104 or that interacts with architecture 100, or both. In client device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communications link 13 communicate with a processor 17 (which can also embody processors or servers from other FIGS.) along a bus 19 that is also connected to memory 21 and input/output, I/O components 23, as well as clock 25 and location system 27.

I/O components 23, in one embodiment, are provided to facilitate input and output operations. I/O components 23 for various embodiments of client device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of client device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores an operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, client device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on client device 16 or applications that are installed during use, although these can be part of operating system 29, or hosted external to client device 16, as well.

FIG. 14 shows one example in which client device 16 is a tablet computer 1400. In FIG. 14, tablet computer 1400 is shown with screen 1402. Screen 1402 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Tablet computer 1400 can also illustratively receive voice inputs as well.

FIG. 15 shows that the device can be a smart phone 71. Smart phone 71 has a touch sensitive display 73 that displays icons or tiles or other user input mechanisms 75. User input mechanisms 75 can be used by a user to run applications, make calls, perform data transfer operations, etc. In general, smart phone 71 is built on a mobile operating system and offers more advanced computing capability and connectivity than a feature phone.

Note that other forms of client devices 16 are possible.

Figure 16:
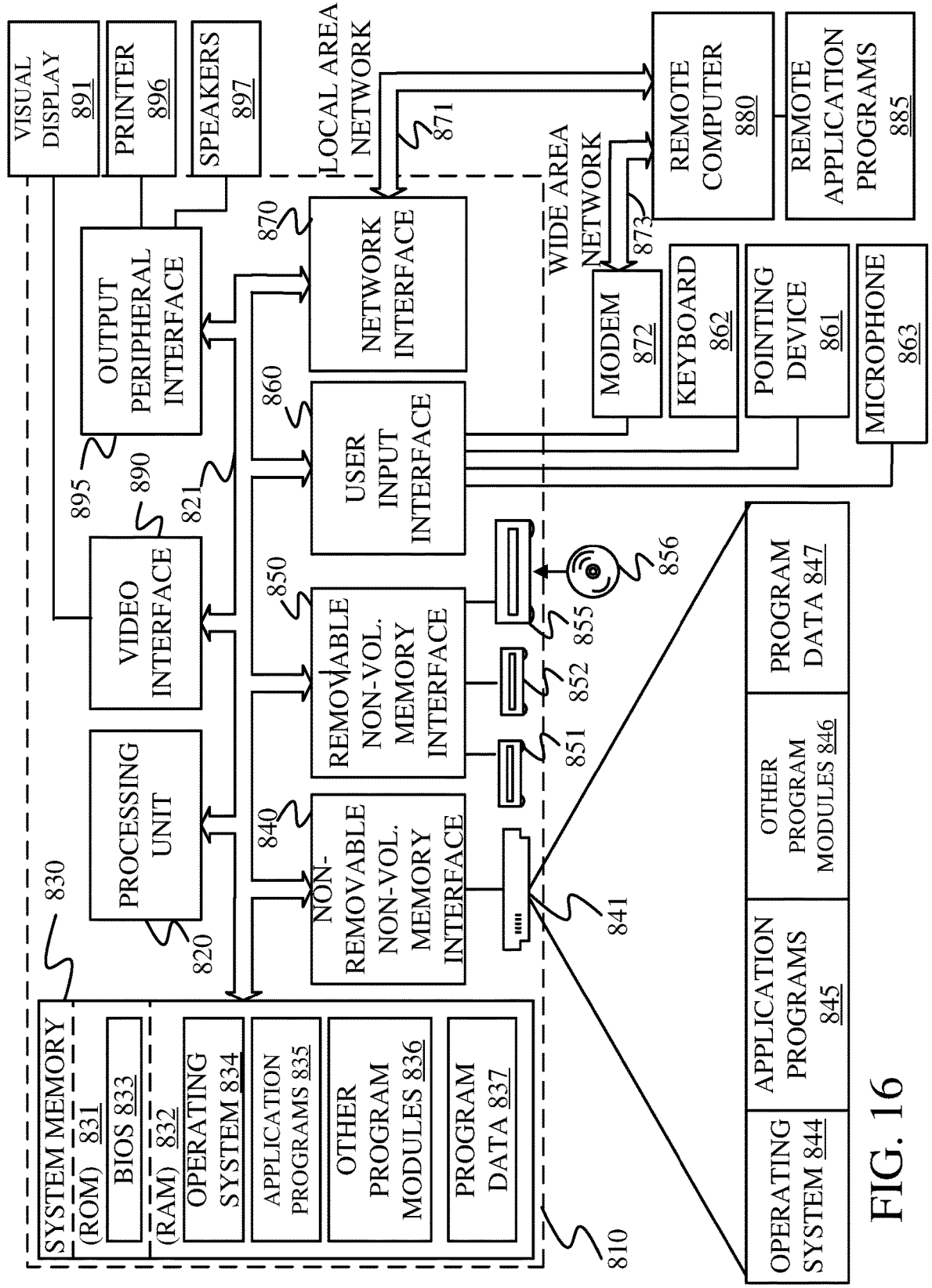
FIG. 16 is a block diagram showing one example of a computing environment that can be used in the architectures shown in the previous figures.

FIG. 16 is one example of a computing environment in which architecture 100, or parts of it, (for example) can be deployed. With reference to FIG. 16, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by compute 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a connection detection system that identifies a set of connected deliverables among a plurality of different deliverables in a data store;
timeline generator logic that generates a representation of a timeline having nodes connected by edges, each node representing a deliverable and each edge connecting a pair of nodes corresponding to a connection between the deliverables represented by the pair of nodes connected by the edge;
a user interaction system that controls interaction with the plurality of different deliverables, the user interaction system comprising:
link setting control logic that generates a link setting user interface mechanism that, in response to actuation of the link setting user interface mechanism, generates a link control signal to modify one or more connections; and
surfacing logic that generates a display control signal to control a display device to display the representation of the timeline and the link setting user interface mechanism.

Example 2 is the computing system of any or all of the previous examples wherein timeline generator logic comprises:
node generator logic that generates the nodes in the representation of the timeline, each node being generated at a point on the representation of the timeline based on date data corresponding to the given node.

Example 3 is the computing system of any or all of the previous examples wherein the connection detection system comprises:
dependency generator logic configured to identify, as a connection between a first deliverable of the plurality of deliverables and a second deliverable of the plurality of deliverables, a dependency in which the first deliverable is dependent on the second deliverable.

Example 4 is the computing system of any or all of the previous examples wherein the link setting logic comprises:
reverse logic configured to generate the link setting user interface mechanism as a reverse dependency user interface mechanism that is actuated to reverse the dependency between the first deliverable and the second deliverable.

Example 5 is the computing system of any or all of the previous examples wherein the link setting logic comprises:
reverse mechanism generator logic that generates the reverse dependency user interface mechanism in association with an edge.

Example 6 is the computing system of any or all of the previous examples wherein the reverse dependency user interface mechanism is actuated when a user actuates an edge associated with reverse dependency user interface mechanism, and in response to the actuation, reverse dependency user interface mechanism controls node generator logic to reverse the positions of nodes connected to the given edge.

Example 7 is the computing system of any or all of the previous examples wherein the link setting logic comprises:
reverse mechanism generator logic that generates the link setting user interface mechanism in association with a node.

Example 8 is the computing system of any or all of the previous examples wherein the reverse dependency user interface mechanism is actuated when a user actuates a node associated with reverse dependency user interface mechanism, wherein the node actuation comprises the user moving the given node to a new location on the representation on the timeline.

Example 9 is the computing system of any or all of the previous examples wherein the connection detection system comprises:
filtering logic configured to generate a filter user interface mechanism that allows a user to select deliverable characteristics; and
deliverable parsing logic configured to access the plurality of deliverables and to filter out deliverables, based on the user selected characteristics, to identify the set of connected deliverables.

Example 10 is the computing system of any or all of the previous examples wherein the timeline generator logic comprises:
a risk metric generator system that generates a risk metric corresponding to each node, the risk metric for each given node being based, at least in part, on a completion status of the deliverable represented by the node
risk indication generator logic configured to generate an indication of the risk metric on the representation of the timeline.

Example 11 is the computing system of any or all of the previous examples wherein the timeline generator logic comprises:
risk indication generator logic configured to generate an indication of the risk metric on the representation of the timeline as part of the edge between the given node and another node, connected to the given node, having a risk metric that affects the risk metric of the given node.

Example 12 is the computing system of any or all of the previous examples wherein the timeline generator logic comprises:

summary generator logic configured to generate a tabular summary, wherein each row of the tabular summary corresponds to a node of the timeline.

Example 13 is the computing system of any or all of the previous examples wherein the timeline generator logic comprises:

collapse logic configured to generate a collapse user interface mechanism that is actuated by a user to toggle a set of nodes from multiple nodes into a single node.

Example 14 is a computer implemented method, comprising:

displaying a deliverable generation user interface mechanism on a display device, the creation user interface mechanism being actuated to create a deliverable;

detecting actuation of the deliverable generation user interface mechanism;

generating a first deliverable and a second deliverable;

displaying a link setting user interface mechanism on the display device, the link setting user interface mechanism configured to generate a dependency between the first and second deliverables;

generating a first node representing the first deliverable and a second node representing the second deliverable;

generating an edge connecting the first node and second node, the edge representing a dependency between the first deliverable and the second deliverable;

generating an interface comprising the first node, second node and edge; and controlling, utilizing surfacing logic, a display device to display the interface.

Example 15 is the computer implemented method of any or all of the previous examples further comprising:

determining a first risk metric for the first node, the first risk metric being based on a completion status of the first deliverable and on a second risk metric indicative of a risk of the second node;

generating a risk indication for the first node, indicative of the first risk metric; and controlling, utilizing the surfacing logic, the display device to display the risk indication.

Example 16 is the computer implemented method of any or all of the previous examples further comprising:

displaying a reverse user interface mechanism; and wherein, in response to an actuation of the reverse user interface mechanism, reversing the dependency between the first deliverable and the second deliverable.

Example 17 is the computer implemented method of any or all of the previous examples further comprising:

generating a third node representing a third deliverable;

generating a fourth node representing a fourth deliverable;

generating a second edge connecting the third node to the second node, wherein the second edge represents a dependency between the second deliverable and the third deliverable; and generating a third edge connecting the fourth node to the second node, wherein the third edge represents a dependency between the second deliverable and the fourth deliverable.

Example 18 is a computing system, comprising:

a dependency system that identifies a set of dependent deliverables among a plurality of different deliverables in a cloud service computing system;

timeline construction logic that generates a representation of a timeline having generally concentric circles of nodes connected by edges, each node representing a deliverable of the plurality of deliverables and each edge, initiating at a first node and terminating at a second node in a pair of nodes, the edge representing a dependence of the first node on the second node;

a risk metric generator system that generates a risk metric corresponding to each node, the risk metric for each given node being based on a number of edges initiating at the given node;

risk indication generator logic that generates an indication of the risk metric for each node on an edge terminating at the given node; and surfacing logic configured to control a display device to display the representation of the timeline with the indication of the risk metric corresponding to each node.

Example 19 is the computing system of any or all of the previous examples wherein timeline construction logic comprises:

reverse logic configured to generate a reverse user interface mechanism on an edge that allows a user to actuate the edge and reverse dependence of a first deliverable represented by the first node on a second deliverable represented by the second node to dependence of the second deliverable on the first deliverable.

Example 20 is the computing system of any or all of the previous examples wherein timeline construction logic comprises:

dependency direction logic configured to generate a dependency indication for each edge, the dependency indication indicative of a direction of dependence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, provide:
a connection detection system that identifies a set of connected deliverables among a plurality of different deliverables in a data store, the set of connected deliverables comprising a first deliverable connected to a second deliverable by a given connection indicating a dependency in which the first deliverable is dependent on the second deliverable;
timeline generator logic that generates a representation of a timeline having nodes connected by edges, each node representing one of the connected deliverables, in the set of connected deliverables, and each edge connecting a pair of nodes corresponding to an identified connection between the deliverables represented by the pair of nodes connected by the edge;
a user interaction system that controls interaction with the set of connected deliverables and comprises link reverse logic that generates a reverse dependency user interface mechanism; and surfacing logic that generates a display control signal to control a display device to display a timeline display pane comprising:
   node display elements representing the first and second deliverables, and
   an edge display element that:
      visually represents the given connection between the first deliverable and the second deliverable, and
      includes the reverse dependency user interface mechanism;
   wherein the link reverse logic is configured to:
      in response to actuation of the reverse dependency user interface mechanism, generate a link control signal to reverse the given connection between the first deliverable and the second deliverable.

2. The computing system of claim 1 wherein timeline generator logic comprises:
   node generator logic that generates the nodes in the representation of the timeline, each node being generated at a point on the representation of the timeline based on date data corresponding to the node.

3. The computing system of claim 2 wherein the connection detection system comprises:
   dependency generator logic configured to identify the connection between the first deliverable of the plurality of deliverables and the second deliverable of the plurality of deliverables.

4. The computing system of claim 1, wherein the reverse dependency user interface mechanism is provided on the edge display element that represents the given connection.

5. The computing system of claim 4, wherein the reverse dependency user interface mechanism is actuated in response to user selection of the edge display element.

6. The computing system of claim 1, wherein the link reverse logic is configured to:
   generate a link setting user interface mechanism in association with a particular one of the nodes.

7. The computing system of claim 6, wherein the reverse dependency user interface mechanism is actuated when a user actuates a particular one of the node display elements to move the particular node display element to a new location on the representation on the timeline.

8. The computing system of claim 1 wherein the connection detection system composes:
   filtering logic configured to generate a filter user interface mechanism that allows a user to select deliverable characteristics; and
   deliverable parsing logic configured to access the plurality of deliverables and to filter out deliverables, based on the user selected characteristics, to identify the set of connected deliverables.

9. The computing system of claim 1 wherein the timeline generator logic comprises:
   a risk metric generator system that generates a risk metric corresponding to each given node, the risk metric being based, at least in part, on a completion status of the deliverable represented by the given node; and
   risk indication generator logic configured to generate an indication of the risk metric on the representation of the timeline.

10. The computing system of claim 9 wherein the timeline generator logic comprises:
   risk indication generator logic configured to generate an indication of the risk metric on the representation of the timeline as part of the edge between the given node and another node, connected to the given node, having a risk metric that affects the risk metric of the given node.

11. The computing system of claim 1 wherein the timeline generator logic comprises:
   summary generator logic configured to generate a tabular summary, wherein each row of the tabular summary corresponds to a node of the timeline.

12. The computing system of claim 10 wherein the timeline generator logic comprises:
   collapse logic configured to generate a collapse user interface mechanism that is actuated by a user to toggle a set of nodes from multiple nodes into a single node.

13. A computer implemented method, comprising:
   displaying a deliverable generation user interface mechanism on a display device, the deliverable generation user interface mechanism being actuated to create a deliverable;
   detecting actuation of the deliverable generation user interface mechanism;
   generating a first deliverable and a second deliverable;
   displaying a link setting user interface mechanism on the display device, the link setting user interface mechanism configured to generate a dependency between the first and second deliverables;
   generating a first node representing the first deliverable and a second node representing the second deliverable;
   generating an edge connecting the first node and second node, the edge representing a dependency between the first deliverable and the second deliverable;
   displaying, on the display device, a timeline display pane that includes a representation of a timeline comprising a first node display element representing the first node, a second node display element representing the second node, and an edge display element that represents the dependency between the first deliverable and the second deliverable, wherein at least one of the first node display element or the second node display element includes a reverse user interface mechanism; and
   in response to actuation of the reverse user interface mechanism,
      reversing the dependency between the first deliverable and the second deliverable; and
      modifying the representation of the timeline in the timeline display pane to indicate the reversed dependency.

14. The computer implemented method of claim 13 further comprising:
   determining a first risk metric for the first node, the first risk metric being based on a completion status of the first deliverable and on a second risk metric indicative of a risk of the second node;
   generating a risk indication for the first node, indicative of the first risk metric; and
   controlling, utilizing the surfacing logic, the display device to display the risk indication.

15. The computer implemented method of claim 13 further comprising:
   generating a third node representing a third deliverable;
   generating a fourth node representing a fourth deliverable;
   generating a second edge connecting the third node to the second node, wherein the second edge represents a dependency between the second deliverable and the third deliverable; and
   generating a third edge connecting the fourth node to the second node, wherein the third edge represents a dependency between the second deliverable and the fourth deliverable.

16. A computing system, comprising:

a dependency system that identifies a set of dependent deliverables among a plurality of different deliverables in a cloud service computing system;

timeline construction logic that generates a representation of a timeline having generally concentric circles of nodes connected by edges, wherein each node represents a particular deliverable of the plurality of deliverables, and each edge represents a connection between a pair of the nodes and includes a dependency indication indicative of a direction of dependence;

a risk metric generator system that generates, for each node, a respective risk metric based on a number of edges initiating at the node; and surfacing logic configured to control a display device to display a timeline display pane that includes:

the representation of the timeline, and for each node, a risk metric display element that identifies the respective risk metric for the node, wherein the risk metric display element is displayed on an edge, terminating at the node in accordance with the direction of dependence of the edge.

17. The computing system of claim 16 wherein timeline construction logic comprises:

reverse logic configured to generate a reverse user interface mechanism on an edge that allows a user to actuate the edge and reverse dependence of a first deliverable represented by the first node on a second deliverable represented by the second node to dependence of the second deliverable on the first deliverable.

18. The computing system of claim 17 wherein timeline construction logic comprises:

dependency direction logic configured to generate a dependency indication for each edge, the dependency indication indicative of a direction of dependence.

* * * * *